(12) United States Patent
Pfingsten et al.

(10) Patent No.: US 8,562,357 B2
(45) Date of Patent: Oct. 22, 2013

(54) INTERACTIVE EDUCATIONAL SYSTEM AND METHOD

(75) Inventors: Marsha F. Pfingsten, Chicago, IL (US); Patricia J. Numann, Syracuse, NY (US)

(73) Assignee: American College Of Surgeons, Chicago, IL (US)

( * ) Notice: Subject to any disclaimer, the term of this patent is extended or adjusted under 35 U.S.C. 154(b) by 873 days.

(21) Appl. No.: 12/575,723

(22) Filed: Oct. 8, 2009

(65) Prior Publication Data

US 2010/0092936 A1 Apr. 15, 2010

Related U.S. Application Data

(60) Provisional application No. 61/103,795, filed on Oct. 8, 2008.

(51) Int. Cl.
G09B 23/28 (2006.01)
G09B 3/00 (2006.01)
G09B 7/00 (2006.01)

(52) U.S. Cl.
USPC ............ 434/262; 434/322; 434/323; 434/350

(58) Field of Classification Search
USPC .................................. 434/262, 322, 323, 350
See application file for complete search history.

(56) References Cited

U.S. PATENT DOCUMENTS

| | | | |
|---|---|---|---|
| 5,704,791 A * | 1/1998 | Gillio | 434/262 |
| 5,791,907 A | 8/1998 | Ramshaw et al. | |
| 5,810,747 A | 9/1998 | Brudny et al. | |
| 6,077,082 A | 6/2000 | Gibson et al. | |
| 6,162,981 A * | 12/2000 | Newcomer et al. | 84/485 R |
| 6,193,519 B1 | 2/2001 | Eggert et al. | |
| 6,246,975 B1 | 6/2001 | Rivonelli et al. | |
| 6,551,107 B1 | 4/2003 | Buckley et al. | |
| 6,692,258 B1 | 2/2004 | Kurzweil et al. | |
| 6,747,672 B1 | 6/2004 | Haakonsen et al. | |
| 6,918,771 B2 | 7/2005 | Arington et al. | |
| 7,114,954 B2 | 10/2006 | Eggert et al. | |
| 7,263,710 B1 | 8/2007 | Hummel, Jr. et al. | |
| 7,386,432 B1 | 6/2008 | Haakonsen et al. | |
| 2004/0064298 A1 | 4/2004 | Levine | |
| 2004/0126745 A1 * | 7/2004 | Bell et al. | 434/201 |
| 2007/0148625 A1 | 6/2007 | Biltz et al. | |
| 2008/0020361 A1 | 1/2008 | Kron et al. | |
| 2008/0293025 A1 | 11/2008 | Zamierowsi et al. | |
| 2009/0142742 A1 * | 6/2009 | Goldberg | 434/362 |

* cited by examiner

*Primary Examiner* — Xuan Thai
*Assistant Examiner* — Jerry-Daryl Fletcher
(74) *Attorney, Agent, or Firm* — Barnes & Thornburg LLP

(57) ABSTRACT

A computerized educational method and system that provides educational content using a simulation situation. In one embodiment, one or more medical conditions and a question may be presented about a hypothetical patient using a video display system. The learner may select from a plurality of potential responses to the question. Typically, the plurality of potential responses are categorized into a correct category, a reasonable category, and a wrong category. Upon receiving a selection from the plurality of potential responses, the learner is provided with the category to which the selected response corresponds.

18 Claims, 62 Drawing Sheets

MOCOB2 Instruction Module - B&T's Internet Explorer http://facs.pointecast.com/lms/runItem/?itemId=85067&parentList=none&saleItemId=0&learningAssignmentId=127920&returnPage=available AMERICAN COLLEGE of SURGEONS
Division of Education FUNDAMENTALS of SURGERY Patient | Records | Tests | References | Help What is/are the appropriate therapeutic intervention(s)?

○ Admit to routine surgical bed for observation
  Central venous pressure monitoring catheter (CVP)
  Consult Gastroenterology service
  Consult internist or other primary care MD for long term follow up care and possible cholesterol reducing medication.
  Dietary restriction of fat to approximately 10-15%
  Discharge home on oral antibiotics
  Foley catheter
○ Inform the senior surgeon
  IV pain medication
  Large bore IV
  Monitor pulse oximetry and if necessary arterial blood gases
  Monitor serum calcium
  NPO and bowel rest
  Supportive care with IV fluids Close Additional action required before
you can continue.

◎ Correct
◎ Potentially helpful
◎ Incorrect

Done | Internet | 100%

FUNDAMENTALS of SURGERY
AMERICAN COLLEGE of SURGEONS
Division of Education

What is/are the appropriate therapeutic intervention(s)?

- Admit to routine surgical bed for observation
- Central venous pressure monitoring catheter (CVP)
- Consult Gastroenterology service
- Consult internist or other primary care MD for long term follow up care and possible cholesterol reducing medication.
- Dietary restriction of fat to approximately 10-15%
- Discharge home on oral antibiotics
- Foley catheter
- Inform the senior surgeon
- IV pain medication
- Large bore IV
- Monitor pulse oximetry and if necessary arterial blood gases
- Monitor serum calcium
- NPO and bowel rest
- Supportive care with IV fluids

- Correct
- Potentially helpful
- Incorrect

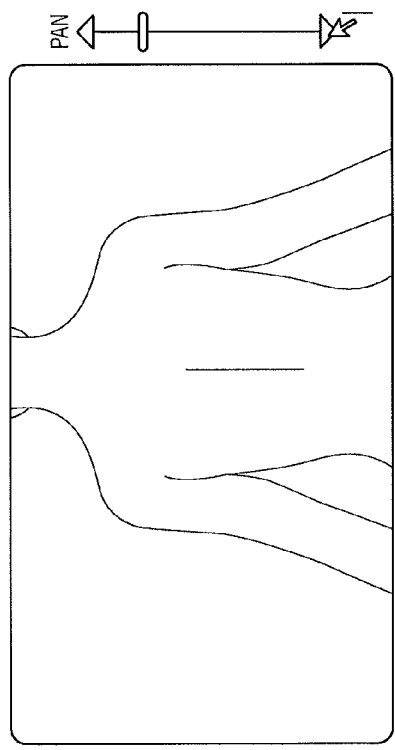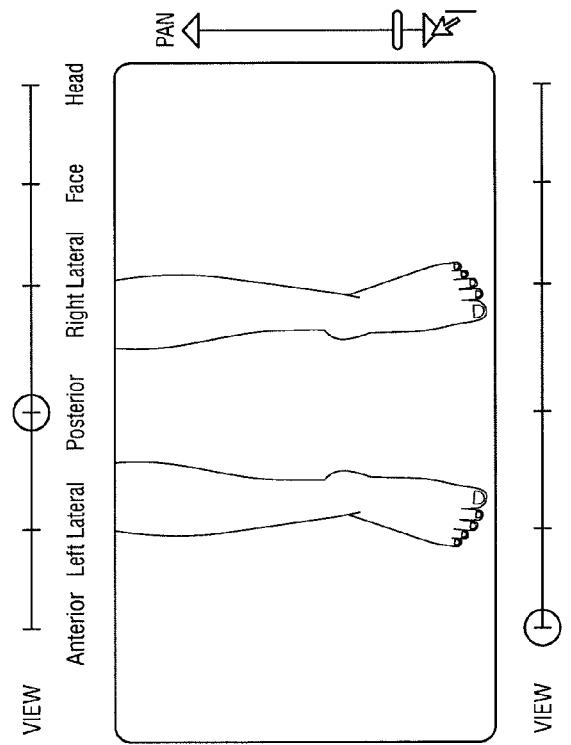
FIG. 60

INTERACTIVE EDUCATIONAL SYSTEM AND METHOD

RELATED APPLICATION

This application claims the benefit of U.S. Provisional Application Ser. No. 61/103,795, filed Oct. 8, 2008, the entire disclosure of which is hereby incorporated by reference.

TECHNICAL FIELD

The present invention relates generally to computerized educational systems; in particular, the invention relates to a system and method that provides educational content using a simulation situation.

BACKGROUND

Educational systems utilizing computers may be used to provide educational content to learners. Although many such systems quiz learners in a question and answer format, which could be suitable in some situations, some learners and educational topics would be better presented in the simulated environment in which these questions are asked as learners would encounter them in a real life situation. It would be beneficial for a medical student, resident, physician, or other health professional (also known as a learner herein), for example, to have a learning environment in which the learner makes decisions regarding what questions to ask patients, what tests and procedures to order to make a diagnosis, and how to manage the patents' conditions, all within the context of a clinical care setting.

Another issue that arises in educational systems is translating the knowledge and expertise of persons in a particular educational topic to a structure that can be used by a programmer. In the medical field, for example, experienced physicians possess valuable medical knowledge that could be taught to a learner. It is difficult, however, to translate this content expertise into a structure that can be presented to a programmer to create an interactive scenario. Therefore, there is a need for a system and method that could translate content expertise into a structure that could easily be used by a programmer to develop an interactive scenario.

SUMMARY

According to one aspect, the invention provides a computerized educational method. The method may include the step of presenting a medical condition of a patient to a learner. A question and a plurality of potential responses are presented to the learner. In some cases, there may be one or more potential responses that are correct, one or more responses that are reasonable answers (but not the best choice), and one or more other responses that are incorrect. If the learner chooses a correct answer, he/she may be presented with health-related information in response. With a reasonable answer, the learner could be presented with a rationale for why the answer may be reasonable, but not the best choice. If the learner selects an incorrect answer, the learner could be presented with a rationale for why the incorrect answer is not correct and/or examples of situations when it would be correct. Thus, this carefully simulated environment teaches learners the cognitive processes—or how to think through—the management of the patient. The simulation resembles the real life experience by presenting information whether it be a laboratory test, X-ray or statement by the patient or another health care provider as it would be stated or discovered in the real life situation.

According to another aspect, the invention provides a method for authoring scenarios for a computerized educational system. The method may include the step of providing a plurality of templates that correspond to interactive user interfaces for a computer program. In some cases, the format of the interactive screens could be substantially pre-determined. Typically, the templates are configured to be interchangeably used without regard to order. Next, a storyboard may be created with the plurality of templates. For example, the storyboard could simulate a learner's role in a patient scenario. The storyboard can then be transformed into an interactive computer program.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIGS. 2 through 51 are screen shots showing an example case according to an embodiment of the present invention;

FIGS. 58 through 62 are screen shots showing an embodiment of conducting a physical examination during a scenario.

Figure 1:
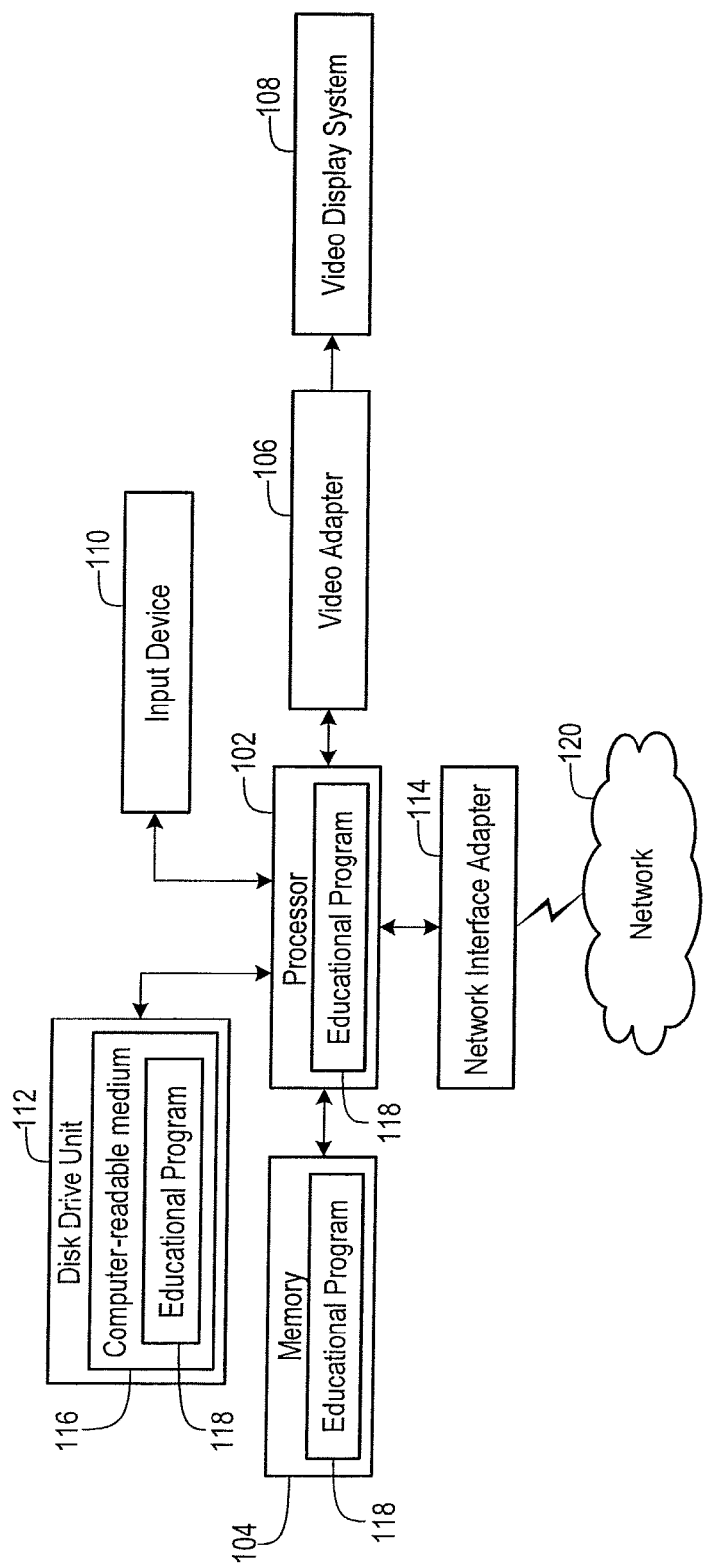
FIG. 1 is a diagrammatic representation of an example machine that may be programmed with a set of instructions to perform any one or more of the methods discussed herein.

Corresponding reference characters indicate corresponding parts throughout the several views. The components in the figures are not necessarily to scale, emphasis instead being placed upon illustrating the principles of the invention. The exemplification set out herein illustrates embodiments of the invention, and such exemplification is not to be construed as limiting the scope of the invention in any manner.

DETAILED DESCRIPTION OF THE DRAWINGS

The present invention relates generally to an educational system and method along with an authoring process that allows persons without programming skills to be able to create new scenarios in this system. In one aspect, the system provides an interactive simulation regarding a particular scenario. The system provides an accurate scenario with what the learner would experience in actual clinical situations. Although the scenarios will be described with respect to the medical field herein, it should be appreciated by one skilled in the art that other types of scenarios could be presented in the educational system. In some cases, the system will provide various modules that surround particular topics of interest for those learners that will be using the system. Within these modules, there could be courses that are more targeted to topics of interest; these courses could be subdivided into branches which are each scenarios that provide the learners with a simulated medical case or scenario for them to diagnose and direct treatment.

FIG. 1 illustrates a diagrammatic representation of a machine 100 in the example form of a computer system that may be programmed with a set of instructions to perform any one or more of the methods discussed herein. The machine may be a personal computer, a tablet computer, a Personal Digital Assistant ("PDA"), a media player, a cellular telephone, or any machine capable of executing a set of instructions (sequential or otherwise) that specify actions to be taken by that machine.

In some embodiments, the machine 100 may operate as a standalone device or may be connected (e.g., networked) to other machines. In embodiments where the machine is a standalone device, the set of instructions could be a computer program stored locally on the device that, when executed, causes the device to perform one or more of the methods discussed herein. In embodiments where the computer program is locally stored, data may be retrieved from local storage or from a remote location via a network. In a networked deployment, the machine 100 may operate in the capacity of a server or a client machine in server-client network environment, or as a peer machine in a peer-to-peer (or distributed) network environment. Although only a single machine is illustrated in FIG. 1, the term "machine" shall also be taken to include any collection of machines that individually or jointly execute a set (or multiple sets) of instructions to perform any one or more of the methods discussed herein.

The example machine 100 illustrated in FIG. 1 includes a processor 102 (e.g., a central processing unit (CPU)), a memory 104, a video adapter 106 that drives a video display system 108 (e.g., a liquid crystal display ("LCD") or a cathode ray tube ("CRT")), an input device 110 (e.g., a keyboard, mouse, touch screen display, etc.) for the user to interact with the program, a disk drive unit 112, and a network interface adapter 114. Note that various embodiments of the machine 100 will not always include all of these peripheral devices.

The disk drive unit 112 includes a computer-readable medium 116 on which is stored one or more sets of computer instructions and data structures embodying or utilized by an educational program 118 described herein. The computer instructions and data structures may also reside, completely or at least partially, within the memory 104 and/or within the processor 102 during execution thereof by the machine 100; accordingly, the memory 104 and the processor 102 also constitute computer-readable media. Embodiments are contemplated in which the educational program 118 may be transmitted or received over a network 120 via the network interface device 114 utilizing any one of a number of transfer protocols including but not limited to the hypertext transfer protocol ("HTTP") and file transfer protocol ("FTP"). The network 120 may be any type of communication scheme including but not limited to fiber optic, wired, and/or wireless communication capability in any of a plurality of protocols, such as TCP/IP, Ethernet, WAP, IEEE 802.11, or any other protocol.

While the computer-readable medium 116 is shown in the example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Figure 2:
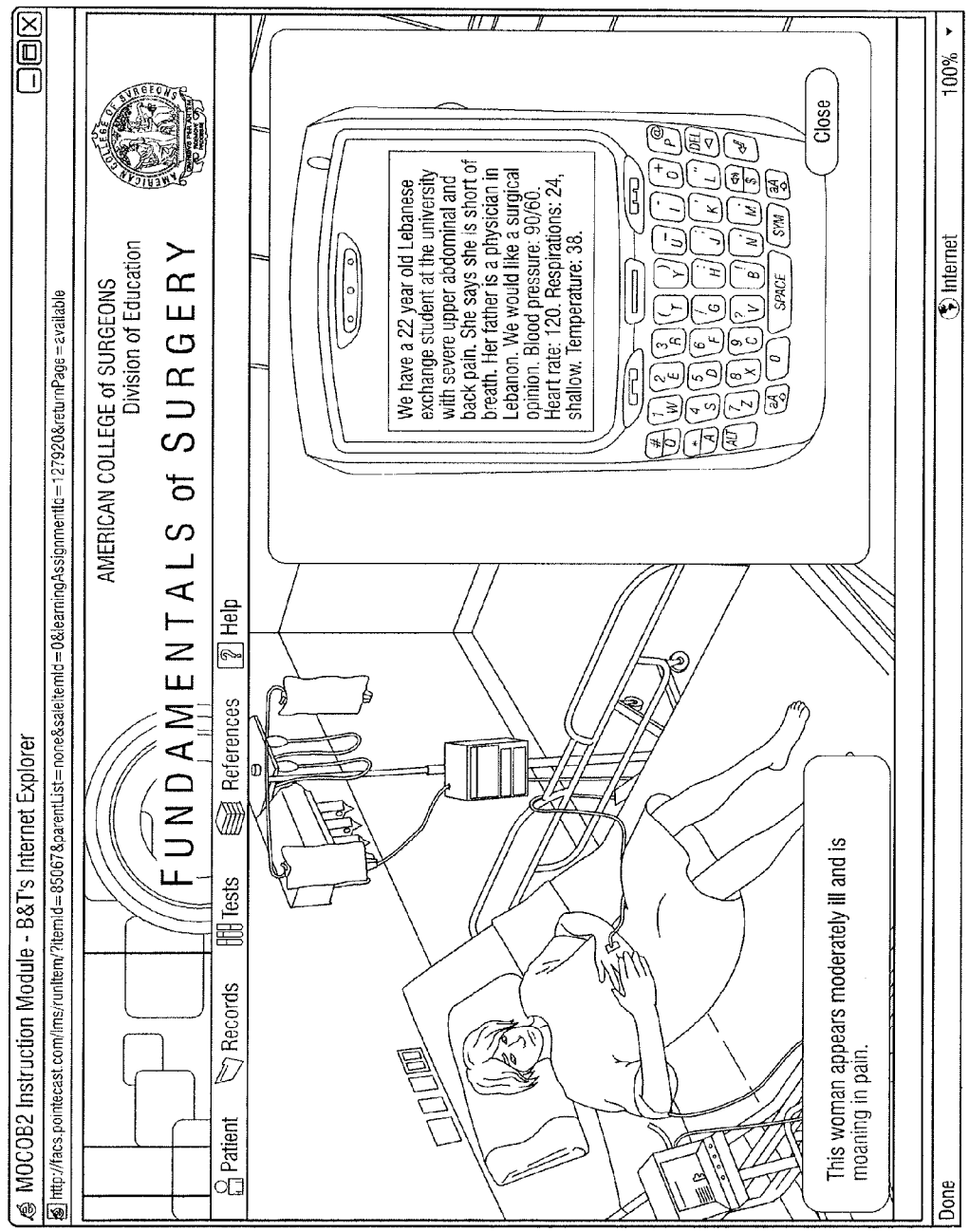

FIGS. 2 through 51 provide an example scenario through which a medical student, resident, physician, or other health care professional would interact with the educational program 118 to learn targeted lessons. Although the example provided relates to surgery, embodiments are contemplated in which this scenario could relate to other areas of medicine (or other fields outside medicine). FIG. 2 shows an introductory screen that may be presented on the video display system 108 in which the learner is presented with a patient having one or more conditions. In this example, the learner received a page with a description of the patient and some of her conditions: "We have a 22 year-old Lebanese exchange student at the university with severe upper abdominal and back pain. She says she is short of breath. Her father is a physician in Lebanon. We would like a surgical opinion. Blood pressure: 90/60. Heart rate: 120. Respiration: 24, shallow. Temperature: 38." Although FIG. 1 shows the use of pager, the learner could be presented with the initial report regarding the patient in a variety of manners, including but not limited to audio from a telephone call, a chart, or video from a nurse or other healthcare provider. The screen shot in FIG. 2 also provides a summary regarding the patient: "This woman appears moderately ill and is moaning in pain." Also shown in this example, the patient is represented in a hospital bed and connected to various medical devices. In some cases, the patient may be shown as an avatar that could represent symptoms from her condition. Likewise, information may be presented using audio when the sounds are important to the learner's interpretation.

FIG. 2 also shows in a toolbar an example user interface that the learner may use to access information. In this example, the user may select "patient," "records," "test," "references," and "help." For example, the learner may access various information about the patient by clicking the "patient" portion of the user interface. By selecting the "records" portion of the user interface, the learner may access the patient's medical record as it is currently known in the scenario. If the learner selects the "test" area of the user interface, the learner may access the test results that have been performed for the patient as currently known in the scenario. These three sections can be populated by additional material as it is discovered throughout the case. For example, the test section may include tests (e.g., images, audio and/or text) before and after the learner orders tests. The "references" area of the user interface provides the learner with access to various reference material on relevant medical topics. These references may be presented before, during, and at the conclusion of the scenario. This allows the learner to be able to focus within the educational system without needing to access outside information regarding the medical topics that are used in this scenario. In some instances, assessment and appropriate intervention is not possible unless the learner has considered the information. In other words, the learner may not be directed to open the records, tests and/or references, but must decide to access them to appropriately handle the case. The "help" area of the user interface allows the learner to access a help menu that may be useful if the learner has any questions about the educational system. Once the learner has reviewed the page, in this example, the learner may click the "close" button to proceed.

Figure 3:
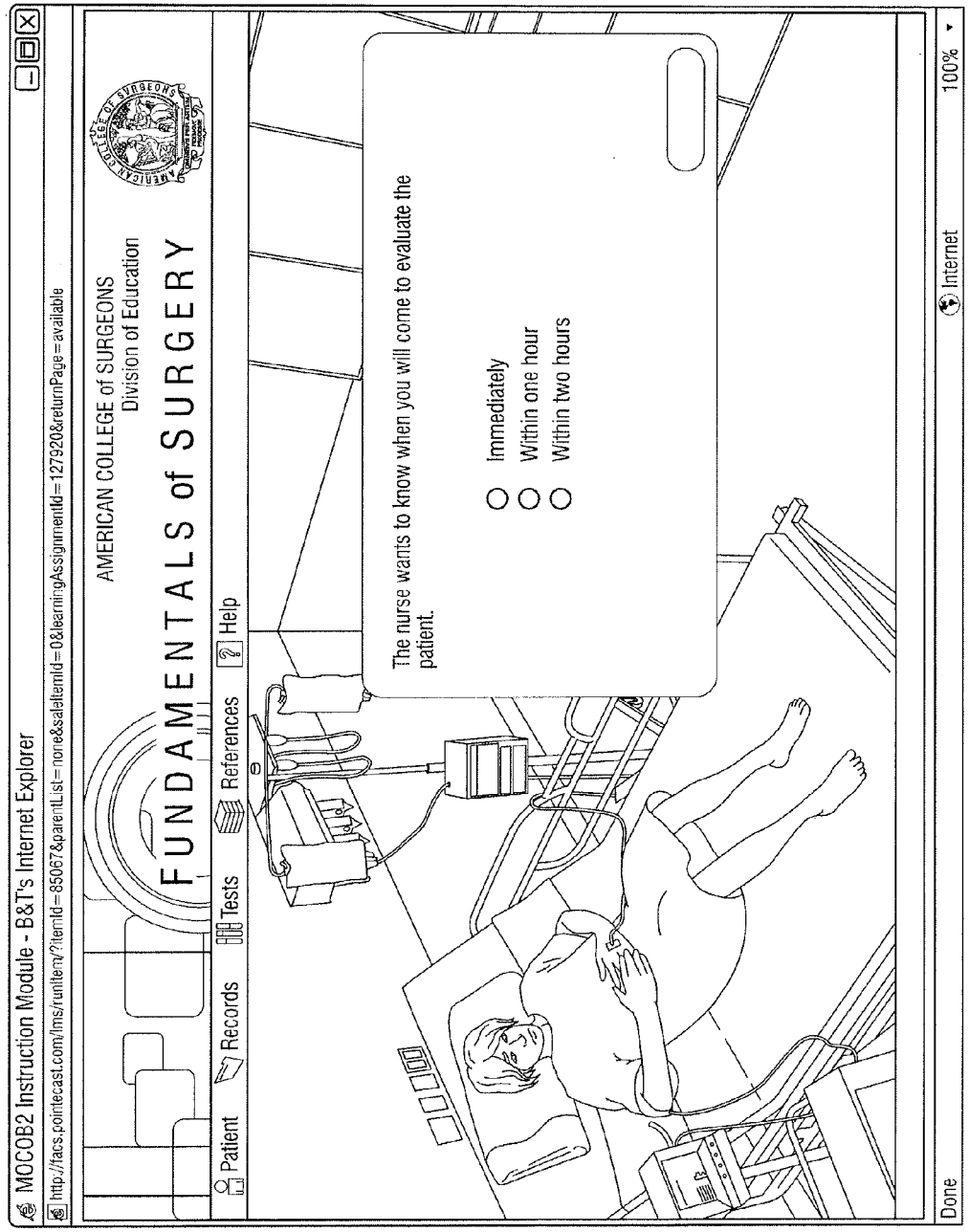

FIG. 3 shows an example screen shot that may appear after the learner selects the "close" button on FIG. 2. In this example, the learner is presented with a screen informing him/her that "the nurse wants to know when you will come to evaluate the patient." In this example screen shot, the learner is presented with three options: (1) immediately; (2) within one hour; and (3) within two hours. This presents a scenario that a learner is likely to encounter and the way in which it might be encountered, and emphasizes the timeliness of response. Thus, the simulation resembles the real life experience by presenting information including but not limited to a laboratory test, X-ray or statement by the patient or another health care provider, as it would be stated or discovered in the real life situation.

Figure 4:
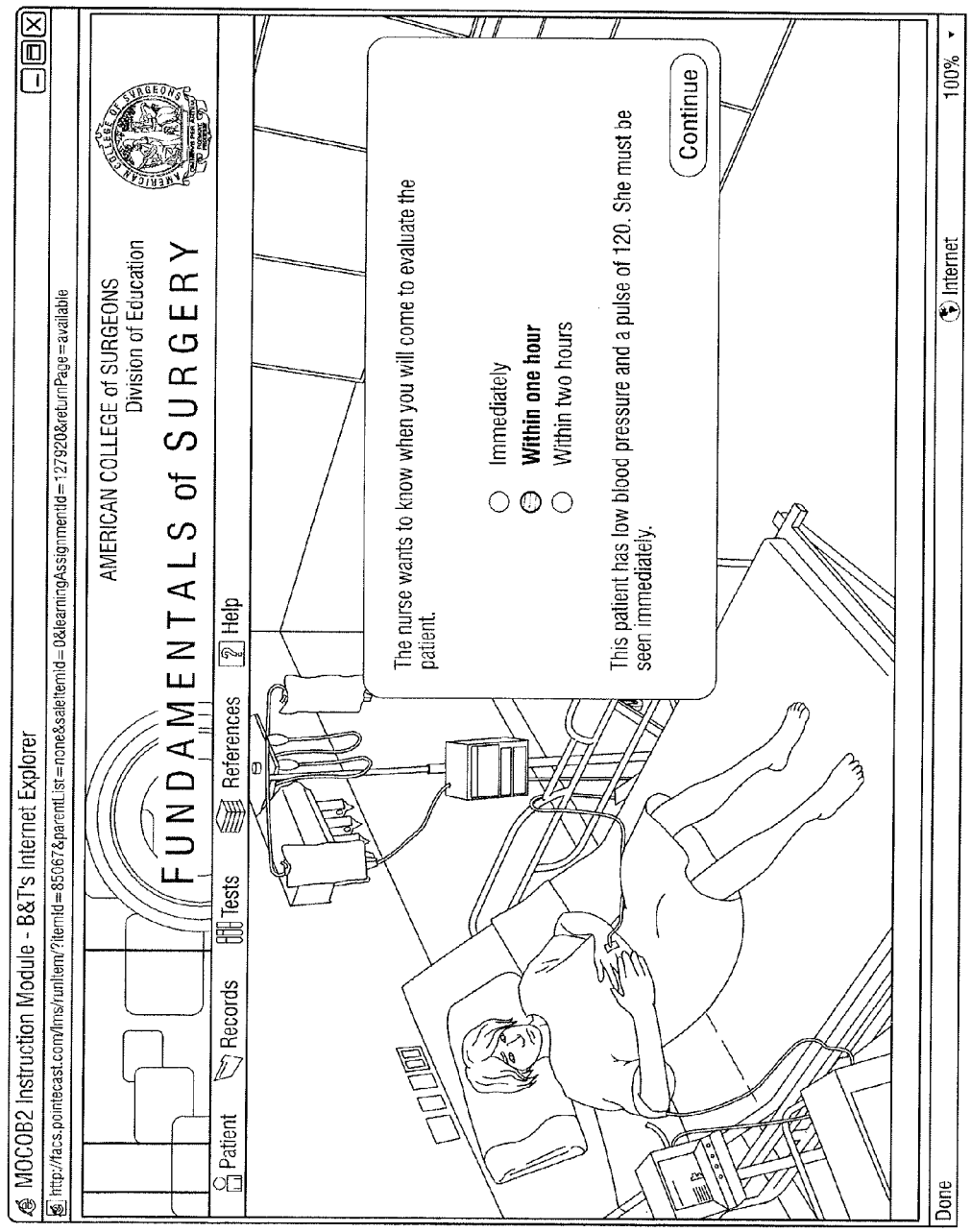

FIG. 4 shows an example screen shot that could appear if the learner selected "within one hour" from the screen shot shown FIG. 3. Upon making this selection, the learner is provided with information explaining why this is not the correct answer: "This patient has low blood pressure and a pulse of 120. She must been seen immediately." In addition, the answer has been noted with a color coded indicator, which could be red in this example, to indicate that the answer is not correct. As discussed below, this embodiment contemplates three different color codes that could be used to identify to the learner whether the answer is correct, reasonable, or incorrect. In the example discussed below, a correct answer is typically indicated with a green color to notify the learner that this answer is correct. A yellow color signifies the learner's selection is reasonable but not the best answer under the circumstances. A red indicator, like that shown in FIG. 4, indicates that the answer is wrong, which may indicate that patient safety is at risk, or the answer would provide irrelevant information or other items. Although these indicators are described as color coded in this example, one skilled in the art should appreciate that a wide variety of indicators, such as text, symbols, or other differentiators, could be provided so the learner could recognize whether the answer is correct, reasonable, or incorrect. In the example shown in FIG. 4, the user is presented with a "continue" button upon making a selection. The learner cannot progress until all correct choices have been selected. In some cases, the patient graphic (or audio and/or video) may be designed to exhibit signs related to the patient's condition that the learner has not been "told about," but must be gleaned from the graphic. In some cases, for example, assessment and appropriate intervention is not possible unless the learner takes note of these signs. FIGS. 52 through 57 provide examples of information that could be available to the learner, which may be necessary for the learner to access for proper assessment and intervention. In the examples shown in FIGS. 52 through 57, the learner must decide to access this information using the toolbar.

Figure 5:
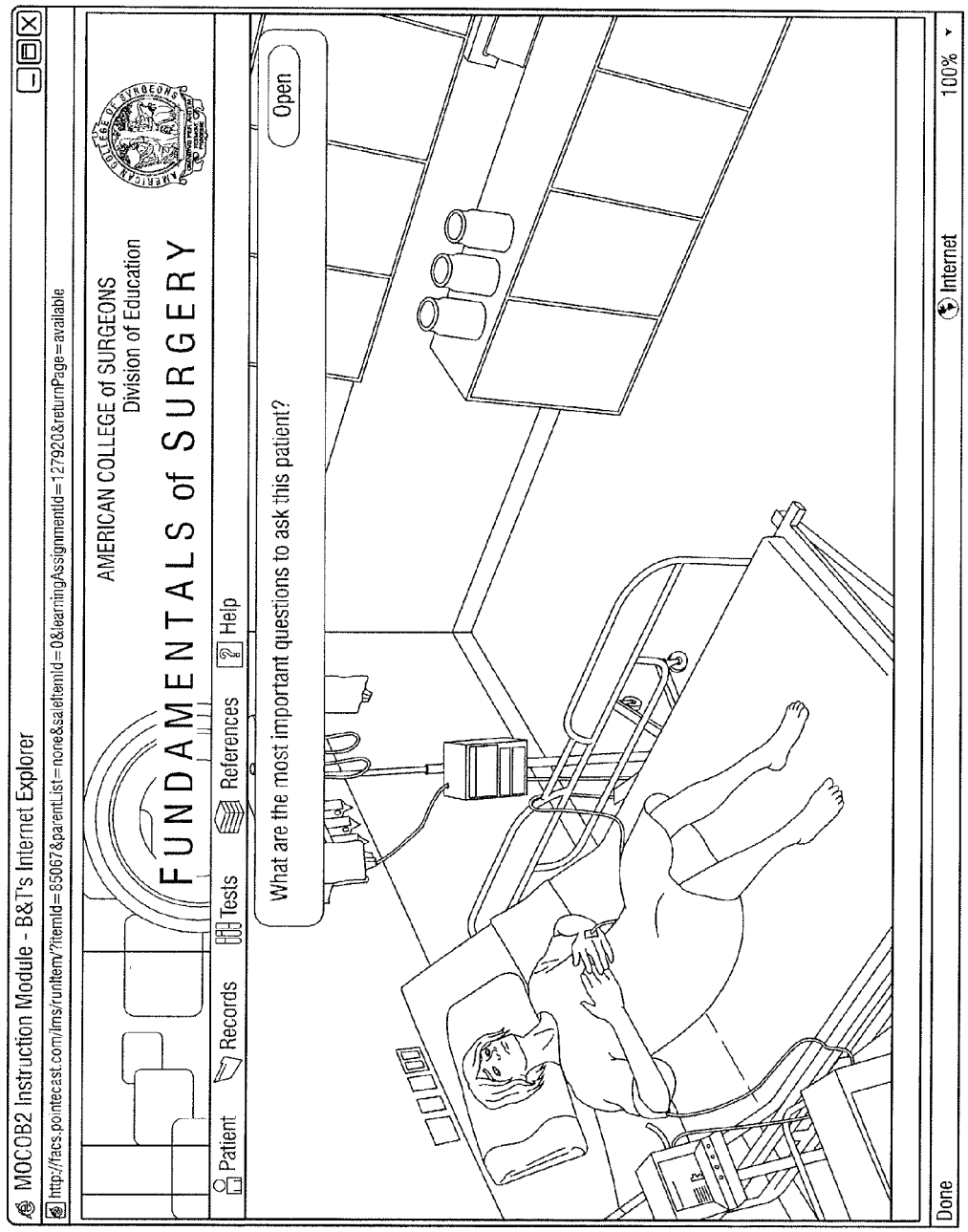
Figure 6:
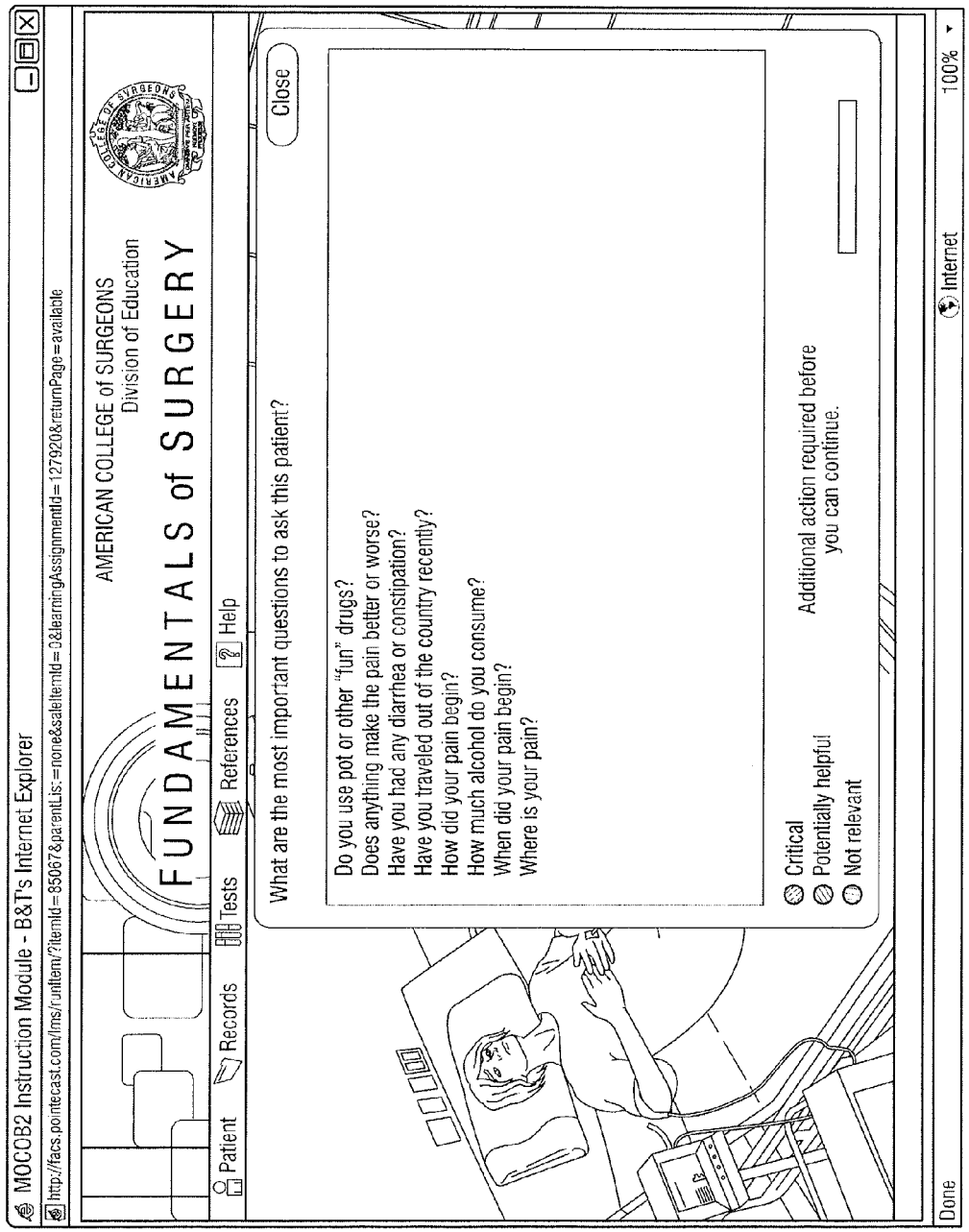

FIG. 5 shows an example of a screen shot that could be presented to the learner upon correctly completing the task and selecting the "continue" button in FIG. 4. In this example, the learner is presented with the question of "What are the most important questions to ask this patient?" Upon selecting the "open" button, the user is presented with a plurality of possible answers in FIG. 6. As discussed, some of these questions may be critical, potentially helpful, or not relevant. In this example after the learner asks the question and receives the response from the patient, a critical question would be indicated by a green indicator, while a potentially helpful question would be indicated by a yellow indicator. If the learner selects a question that is not relevant, that question would be marked with a red indicator. Also in this example, there is a status indicator in the lower right hand corner as shown which indicates that additional action must be performed before the learner is allowed to continue. Also in this example, the learner may not reverse course or go backwards to redo a portion while in the middle of a scenario, just as in real life one cannot go back.

Figure 7:
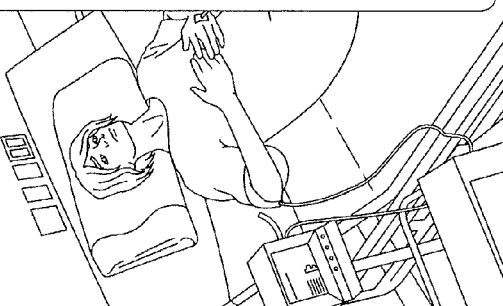
Figure 8:
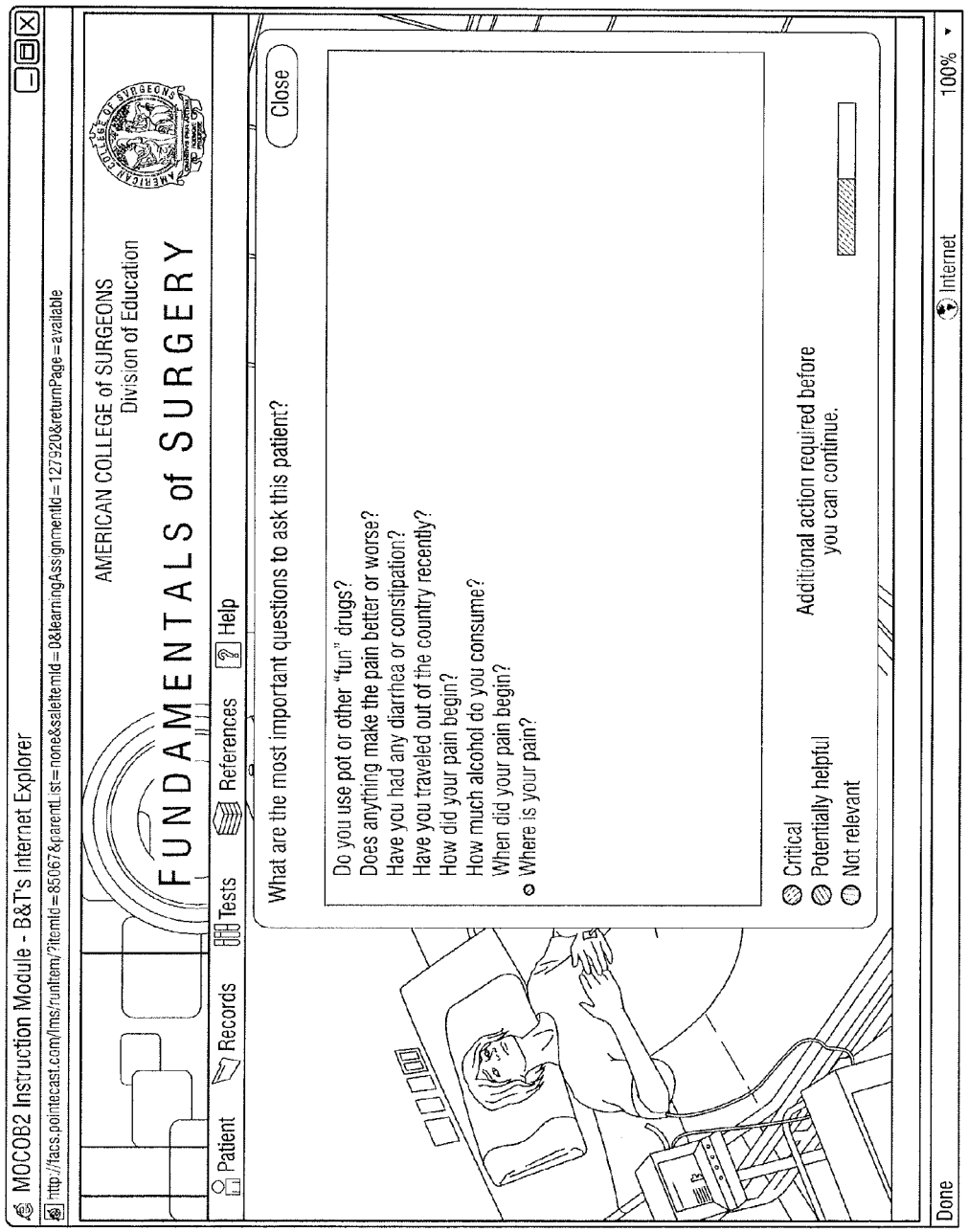

FIG. 7 shows an example screen that may appear upon the learner selecting the question "Where is your pain?" In response to selecting this question, the learner is presented with an answer from the patient: "Patient points to her upper abdomen. 'It is here and goes all the way through into my back.'" Although this information is presented in text form in the example shown in FIG. 7, this could be presented in other ways, including audio or multimedia presentations. When the learner has completed reading the patient's answer, the learner may click "ok" to continue. FIG. 8 shows an example screen that could be presented to the learner upon selecting the "ok" button from FIG. 7. As shown in this example, the "Where is your pain?" has been notated with a green indicator, which means that this was a critical question. Since the learner has selected a critical question, the status indicator has changed to show that progress has been made, but additional action is required to continue.

Figure 9:
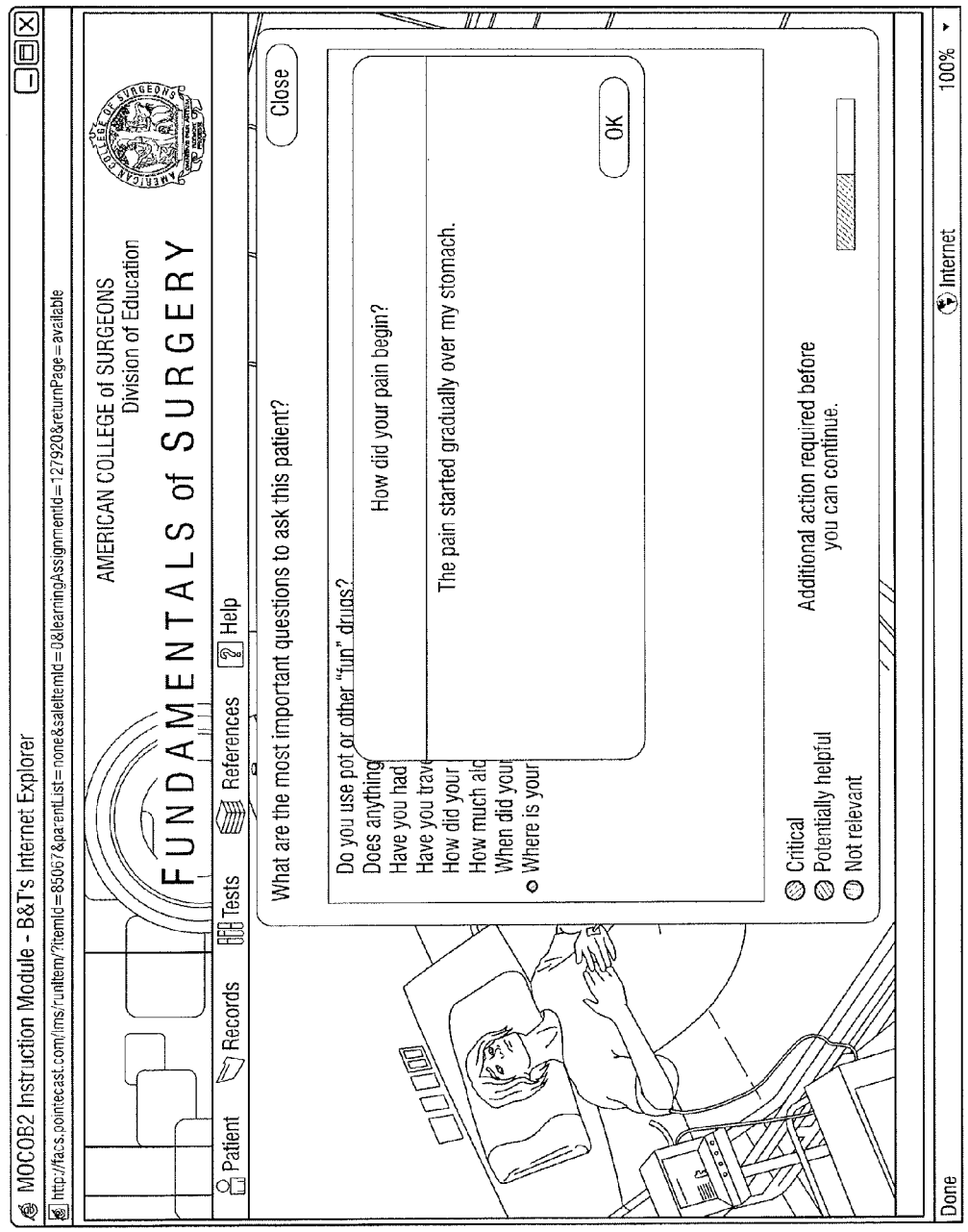
Figure 10:
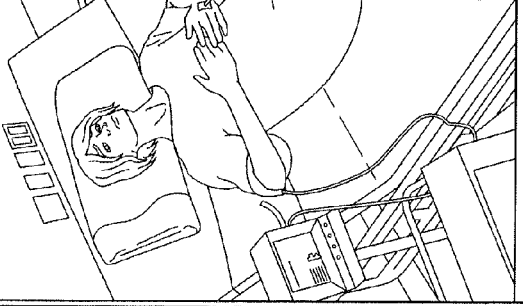

FIG. 9 shows an example screen that could be presented to the learner upon selecting the question "How did your pain begin?" As shown in this example, the patient responds with "The pain started gradually over my stomach." Upon reading the answer from the patient, the learner may select the "ok" button to continue. FIG. 10 shows an example screen that could be presented to the learner upon selecting the "ok" button in FIG. 9. The question "When did your pain begin?" has been notated with a green indicator, which means that this was a critical question. In this example, the learner needed to ask two critical questions before proceeding further in this scenario. Since the two correct critical questions have now been asked, the status indicator now displays 100% completion and a "continue" button appears that allows the learner to continue in the scenario. In some embodiments, the "continue" button may not be present, but the learner could automatically be provided the next portion of the scenario after each of the critical questions have been selected. Likewise, it should be appreciated that the screen shots are provided for example purposes only and may not include all components shown and/or represent these components in other ways.

Figure 11:
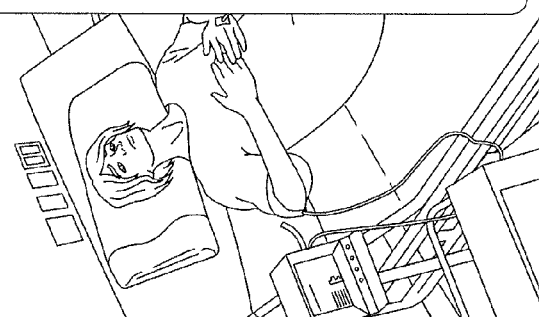

FIG. 11 shows an example screen shot that may be presented to the user upon selecting the "continue" button in FIG. 10. This example asks the learner to determine the most likely initial impressions. As discussed previously, the learner is presented with a plurality of possible initial impressions, some of which may be potentially correct, some of which may be reasonable but less likely, and some which are incorrect. A status indicator is provided on the screen shot which indicates that additional action is required by the learner before proceeding further in the scenario.

Figure 12:
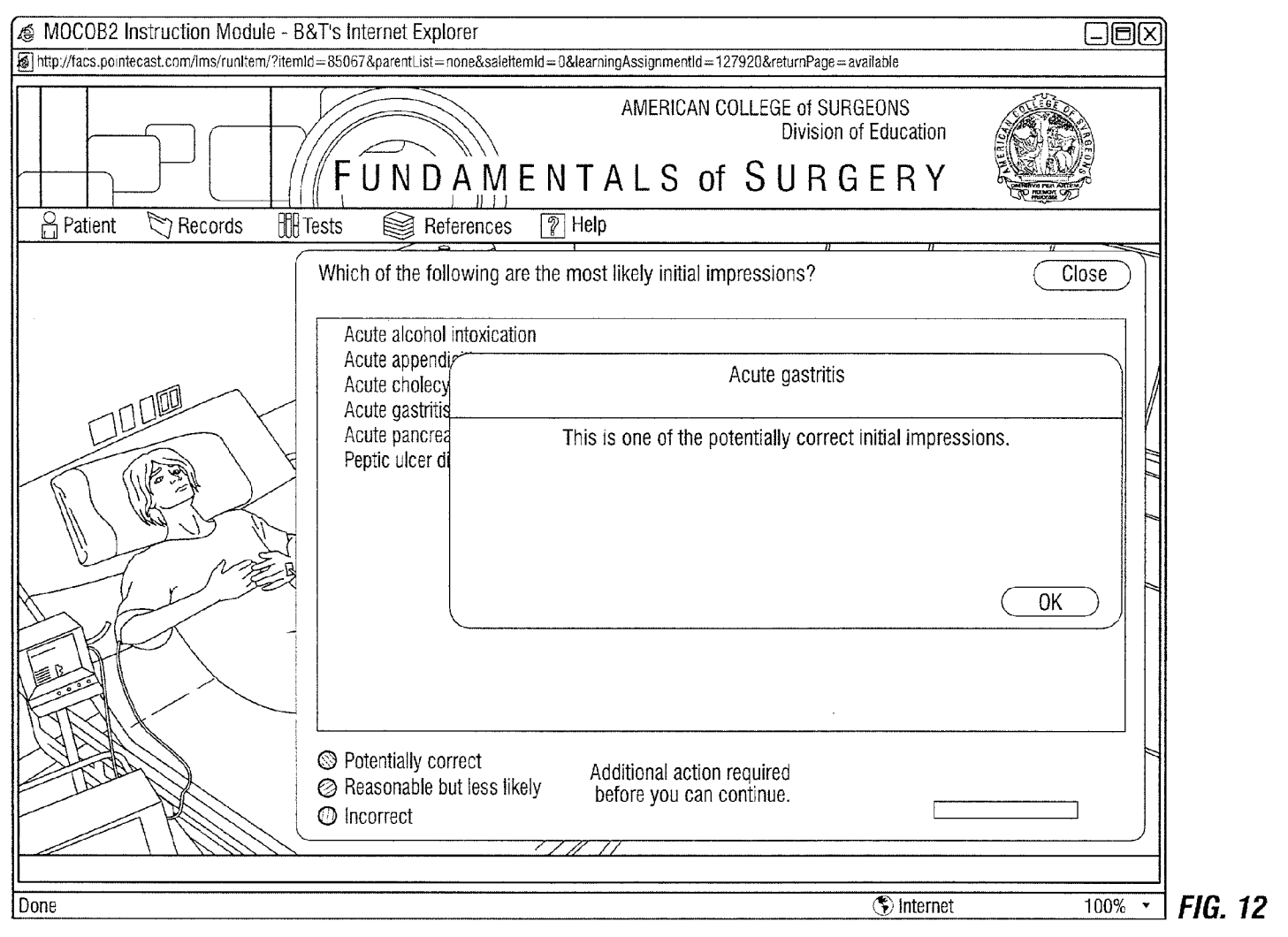

FIG. 12 shows an example screen shot that may be presented to the learner upon selecting the initial impression of "acute gastritis." The learner is provided with positive feedback that this is one of the potentially correct initial impressions. Upon reading this, the learner would select the "ok" button to continue.

Figure 13:
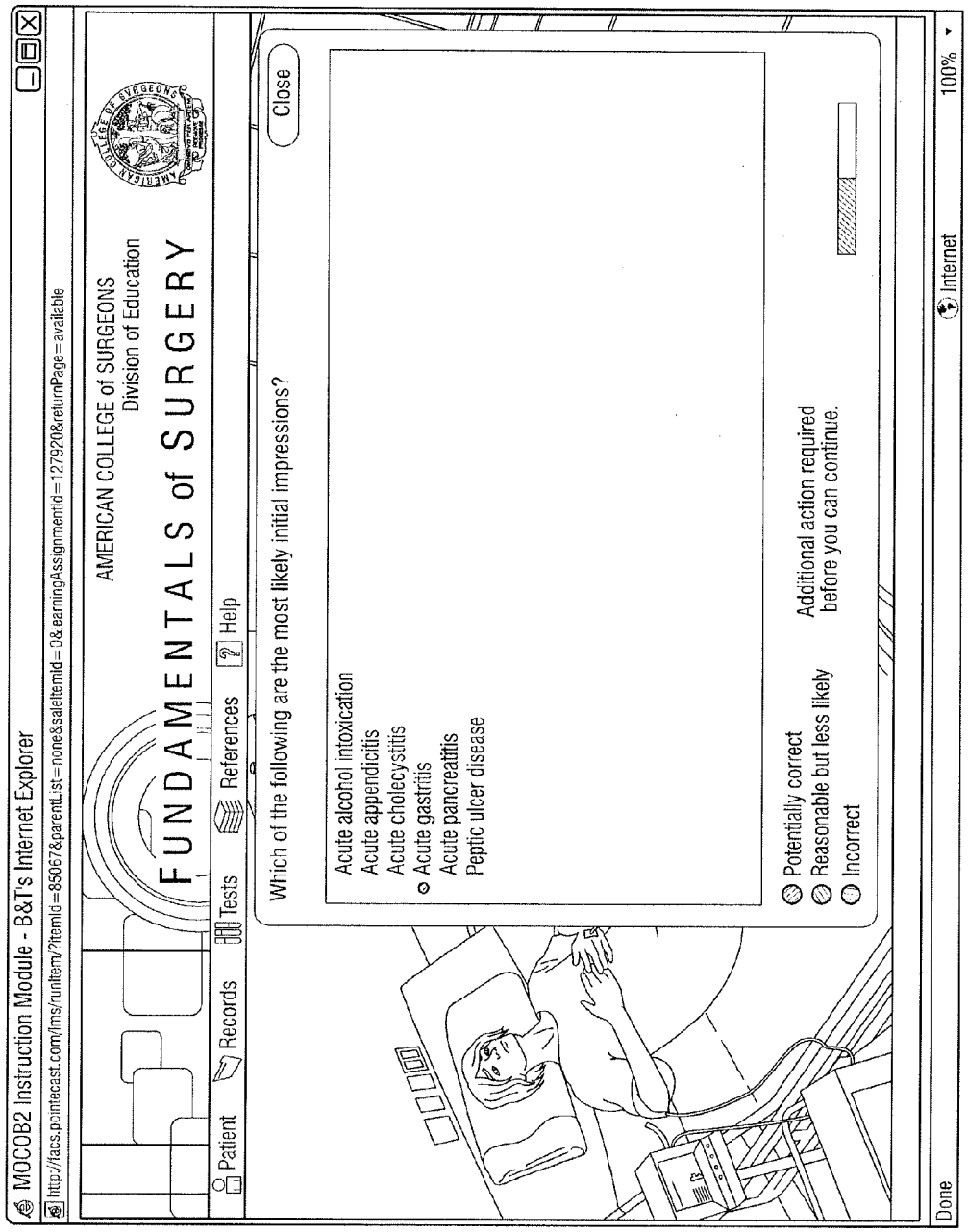

FIG. 13 shows an example screen shot that may be presented to the learner upon selecting the "ok" button in FIG. 12. Since acute gastritis was one of the potentially correct initial impressions, this has been noted with a green indicator. Also, the status indicator has changed to show that the learner has made progress by identifying a potentially correct initial impression. Since this example only requires two potentially correct initial impressions, the status indicator reveals that the learner is 50% complete with determining the most likely initial impressions.

Figure 14:
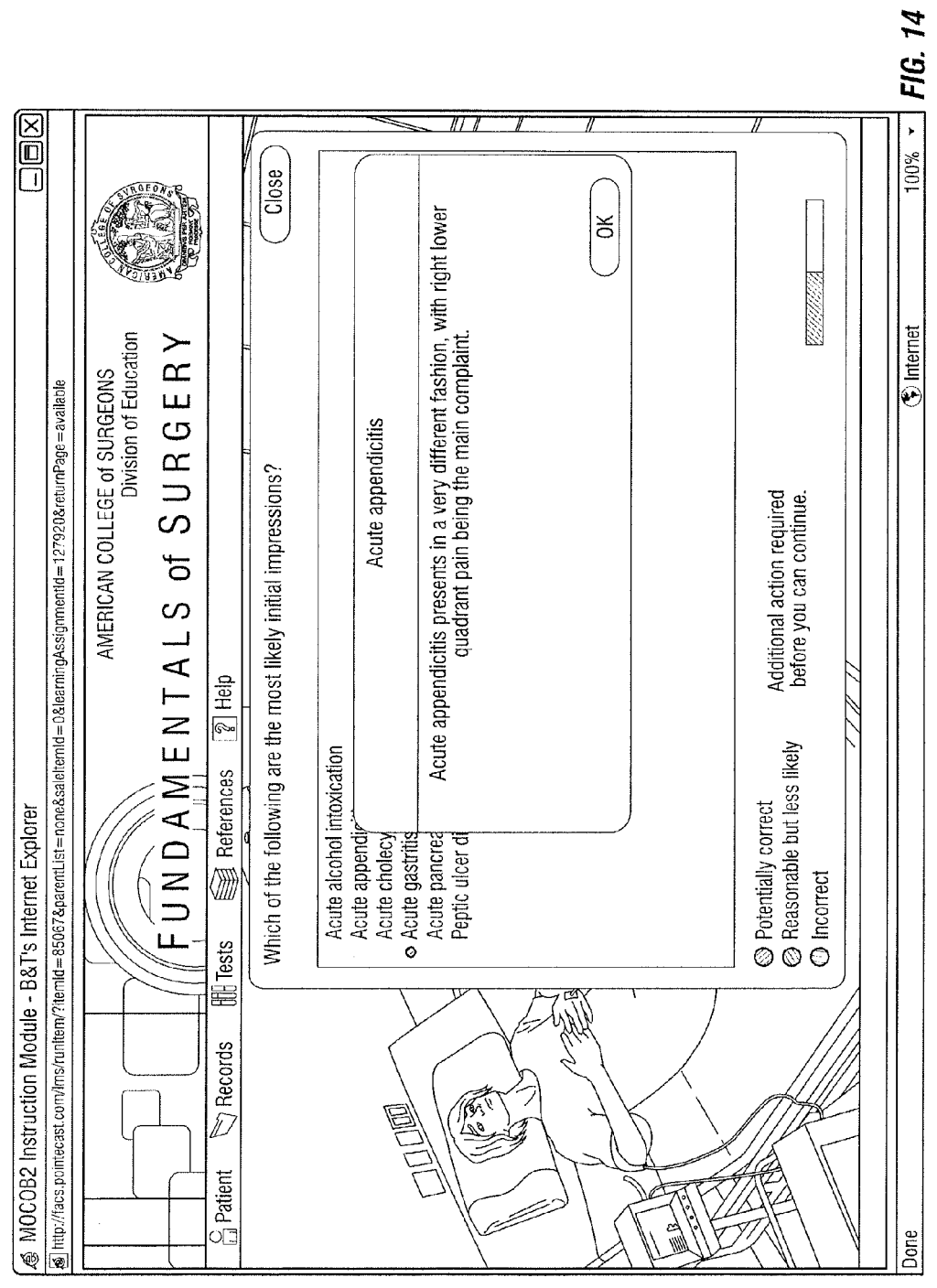
Figure 15:

FIG. 14 shows an example screen shot that could be presented to the learner upon selecting "acute appendicitis." The learner is presented with feedback explaining why this is not a potentially correct initial impression: "Acute appendicitis presents in a very different fashion, with right lower quadrant pain being the main complaint." Upon selecting the "ok"

button, the learner receives a grade for the selection, represented by a colored dot. Each section includes a key to identify the meaning of the colored dots. FIG. 15 shows an example screen shot that could be presented to the learner upon selecting "acute cholecystitis." In this example, the learner is provided with positive feedback that this is one of the potentially correct initial impressions. Also visible in FIG. 15 is the yellow indicator notating that the learner's previous selection of acute appendicitis is reasonable but less likely.

Figure 16:
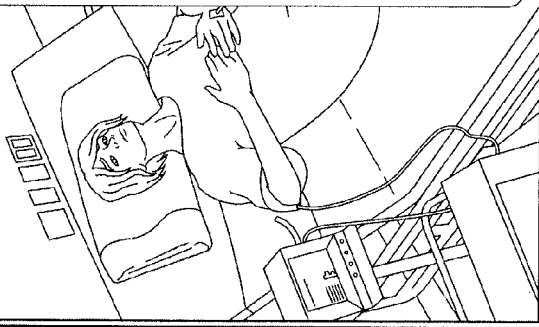

FIG. 16 shows an example screen shot that may be presented to the learner upon selecting the "ok" button in FIG. 15. Since the learner has selected two potentially correct initial impressions, the status indicator shows that the learner is 100% complete with this portion of the scenario and may select "continue" to proceed. It should be appreciated by one skilled in the art that although this example requires two potentially correct initial impressions, more than this could be required before the learner is allowed to proceed; conversely, the scenario may only include one potentially correct initial impression which would be required to be identified before the learner is allowed to proceed.

Figure 17:
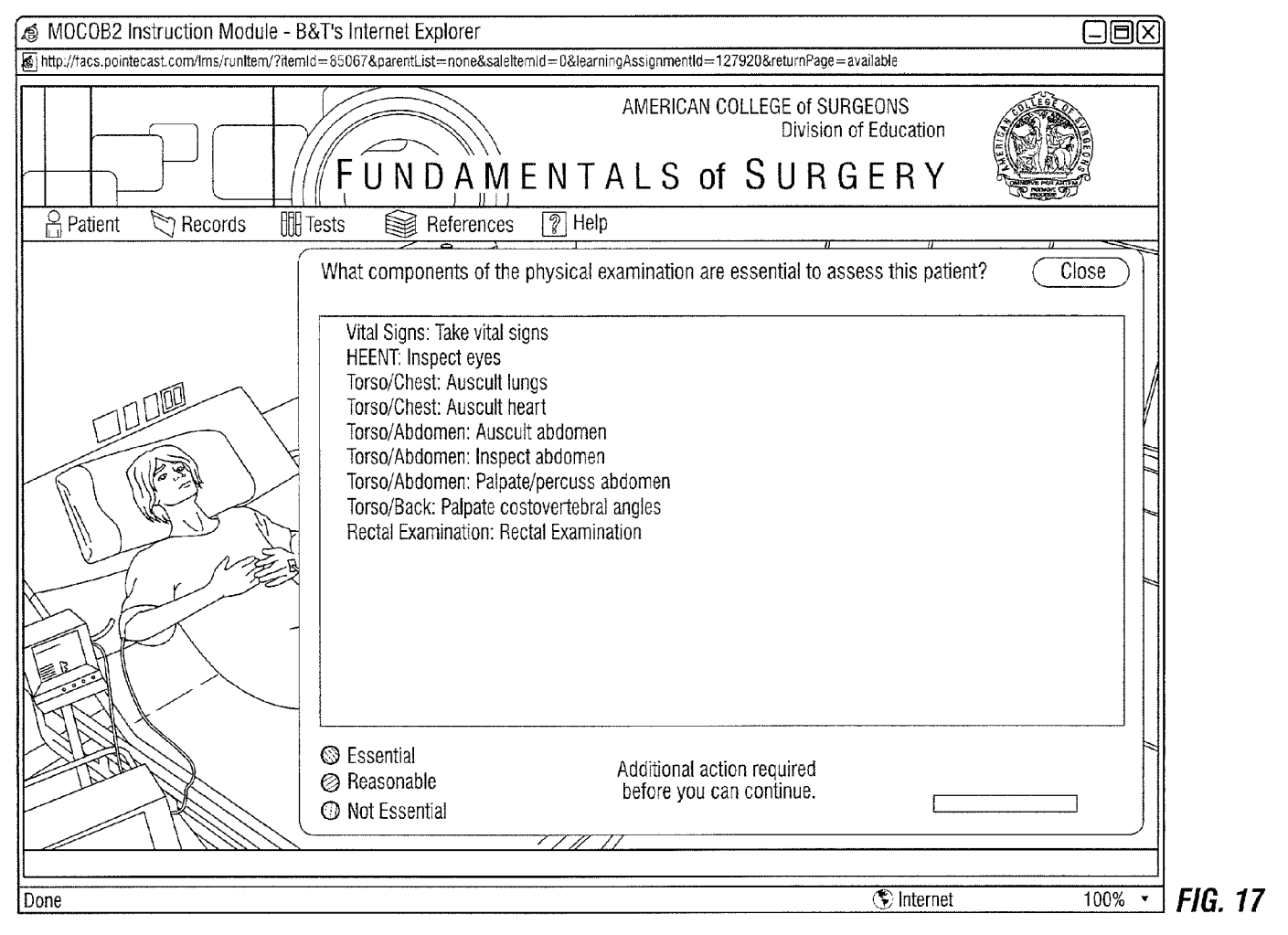

FIG. 17 shows an example screen shot that may be presented to the learner upon selecting the "continue" button shown in FIG. 16. In this screen, the learner is asked to identify the components of a physical examination that are essential to assess the patient. The learner is presented with a plurality of possible options, some of which may be essential, reasonable, or not essential. The response may be a text description, an image, or a sound. One, two, or more of these components may be required to be identified by the learner prior to proceeding. The status indicator indicates that the additional action is required before the learner may continue with the scenario.

Figure 18:
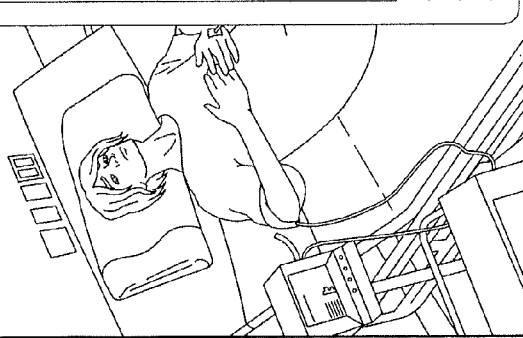
Figure 19:

FIG. 18 shows an example screen shot that may be presented to the learner upon selecting "torso/abdomen:inspect abdomen" from the list of options. The learner is provided with information that "the upper abdomen appears full. The lower quadrants appear normal." Upon reviewing this assessment, the learner may continue by selecting the "ok" button. FIG. 19 shows an example screen shot that may be presented to the learner upon selecting the "ok" button in FIG. 18. In the example shown, the "torso/abdomen:inspect abdomen" component is notated with a yellow indicator, which means the component was reasonable but not essential.

Figure 20:
Figure 21:

FIG. 20 shows an example screen shot that may be presented to the learner upon selecting "rectal examination: rectal examination." The learner is presented with information that: "Digital rectal examination is normal. Stool guaiac negative." Upon reading this information, the learner may select "ok" to continue. FIG. 21 shows an example screen shot that may be presented to the learner upon selecting the "ok" button in FIG. 20. In this example, the learner's most recent selection of "rectal examination: rectal examination" could be notated by a green indicator, which means this was an essential component of the physical examination. Due to this essential component being identified, the status indicator has changed to indicate that the learner has shown progress in this identification but additional action is required to proceed.

Figure 22:
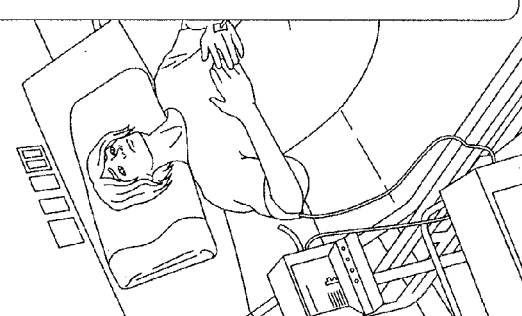

FIG. 22 shows an example screen shot that may be presented to the learner upon selecting "torso/abdomen: palpate/percuss abdomen." Here, in this example, the learner is provided with information regarding this examination: "On palpation, the epigastrium is tender with voluntary guarding. The right upper and left upper quadrants reveal voluntary guarding with more tenderness toward the epigastrium. Palpation of the right and left lower quadrants is normal. On percussion, no peritoneal signs are present. Palpation of the mid abdominan rules out aortic abnormality." Upon reading this information, the learner may select "ok" to continue.

Figure 23:

FIG. 23 shows an example screen shot that may be presented to the learner upon selecting the "ok" button in FIG. 22. As shown in this example, the "torso/abdomen: palpate/percuss abdomen examination was essential, which is why this is notated with a green indicator. Since the learner has selected the essential components of the physical examination, a status indicator is now 100% (indicating there were only two essential components) and therefore the learner may proceed with this scenario by selecting the "continue" button.

Figure 24:
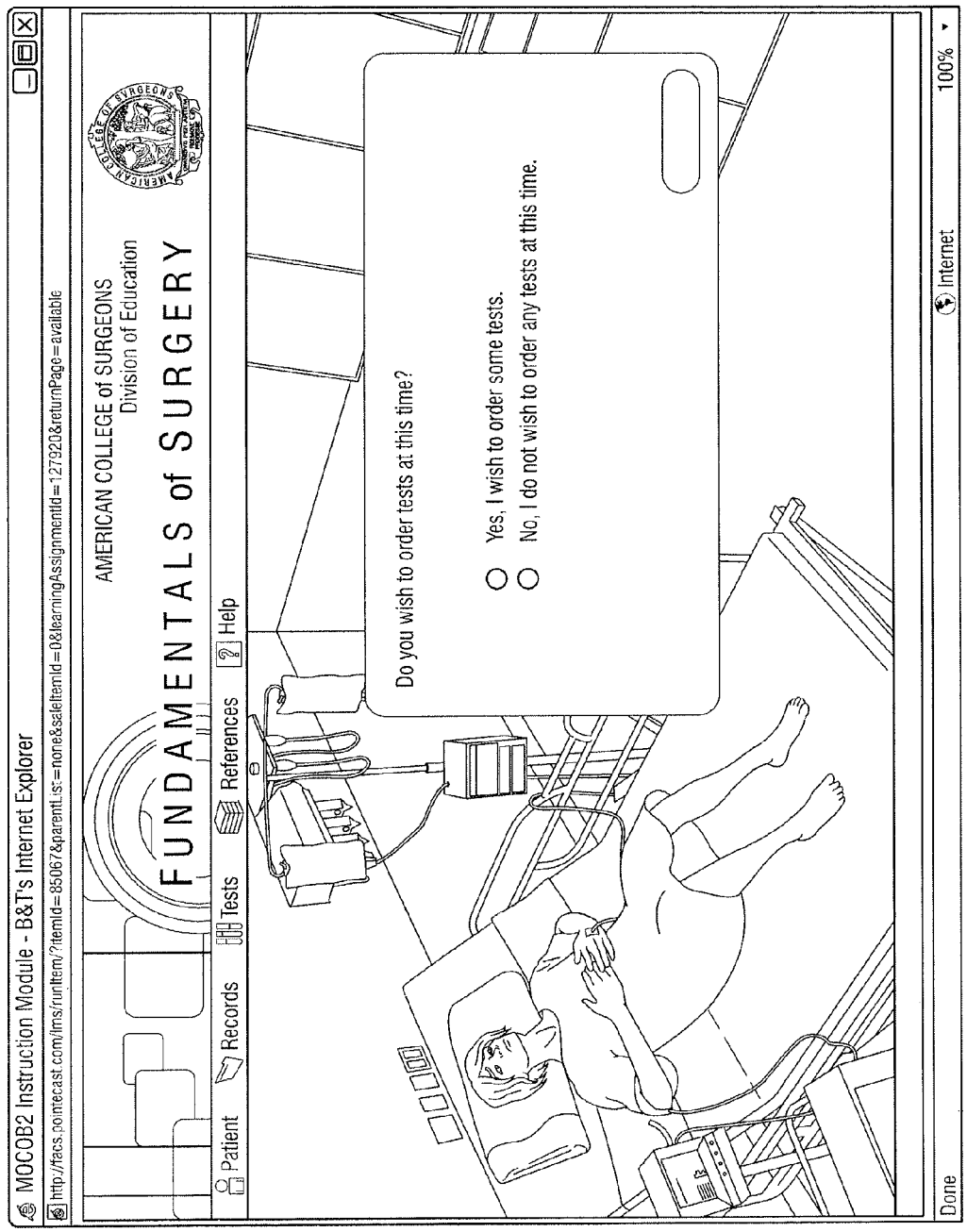
Figure 25:
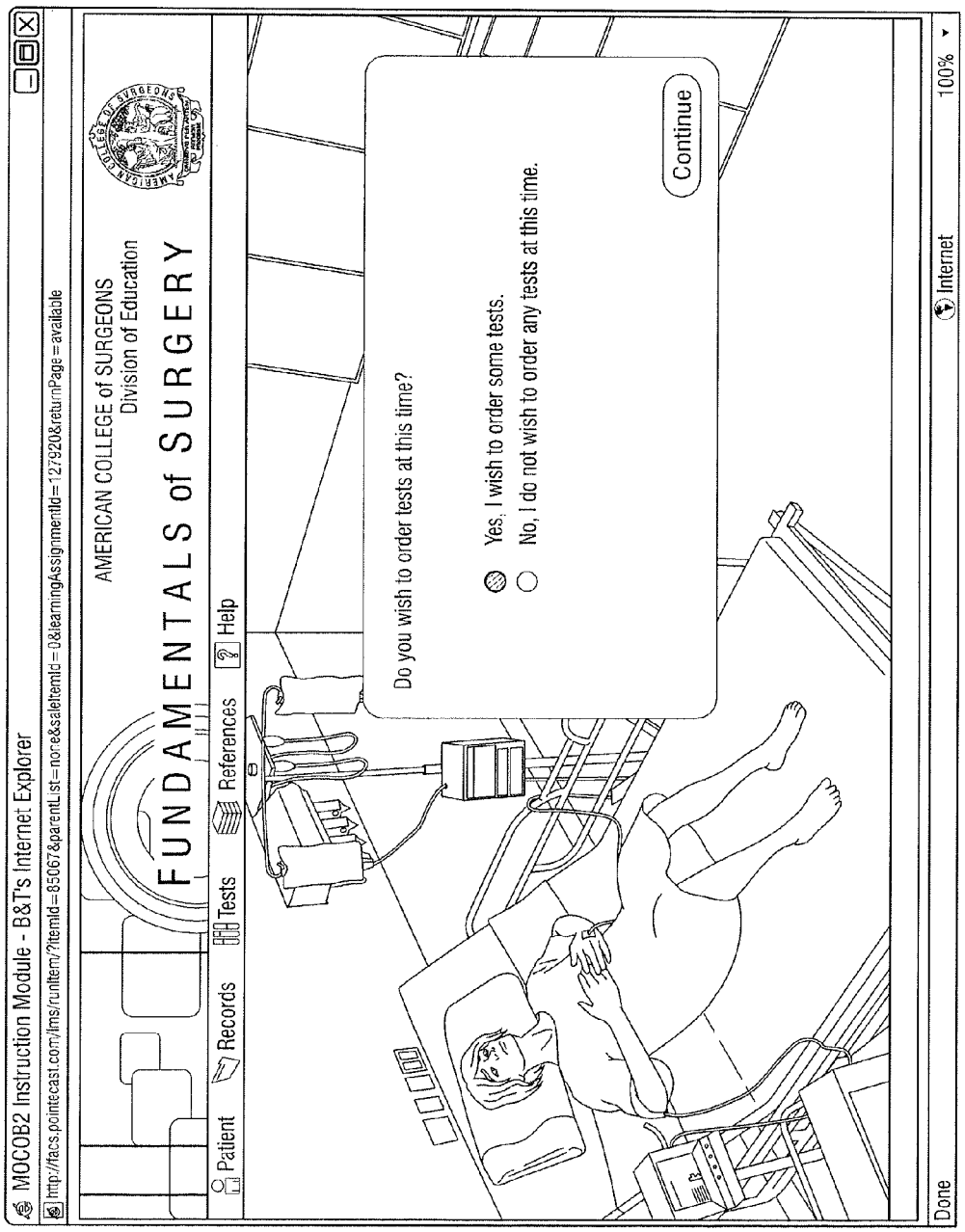

FIG. 24 shows an example screen shot that may be presented to the learner upon selecting the "continue" button in FIG. 23. In this example screen shot, the learner is asked whether if he/she wishes to order tests at this time. FIG. 25 shows an example screen shot in which the learner has selected "Yes, I wish to order some tests," which is correct. Accordingly, the learner may select the "continue" button to proceed with the scenario.

Figure 26:
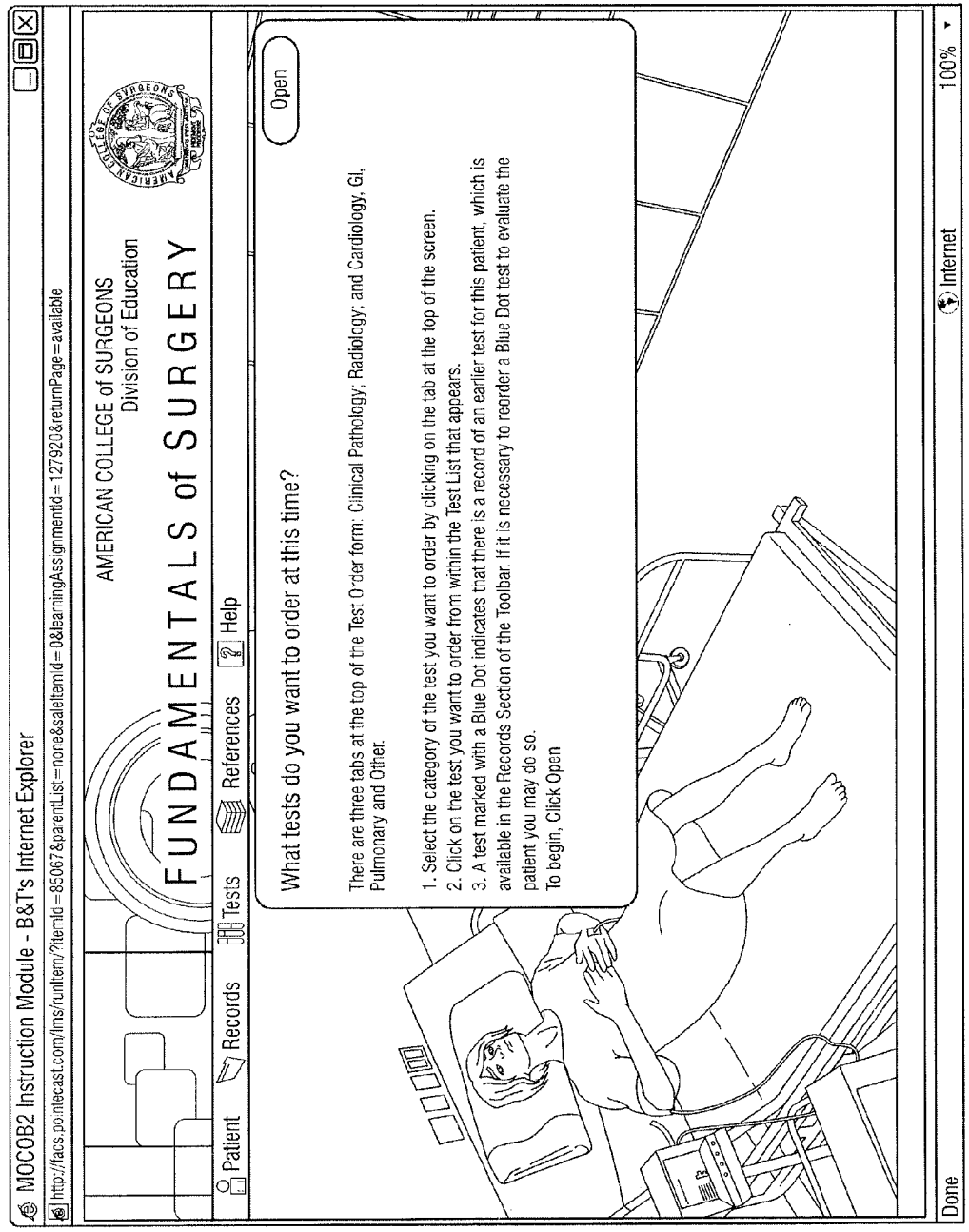
Figure 27:
Figure 28:

FIG. 26 asks the learner to determine what tests should be ordered at this time. FIG. 27 provides instruction regarding ordering tests. FIG. 28 shows a list of tests that could be ordered by the learner. There is a number of "$" provided next to these tests which indicates the relative expense of these tests and could be used to tabulate the cost per case. Also seen in FIG. 28 is a status indicator that shows the learner whether additional tests need to be ordered prior to proceeding further with this scenario. FIG. 28 shows that from the list of a plurality of tests that may be performed, some may be critical, potentially helpful, not relevant, or an earlier report may be available. This provides feedback for the learner to know whether the tests that had been ordered are really relevant or not.

Figure 29:

FIG. 29 shows an example screen shot that may be presented to the learner upon selecting the test "stool for ova and parasites." The learner is provided with feedback that this test is not essential to the diagnosis. The learner may continue by selecting the "ok" button.

Figure 30:
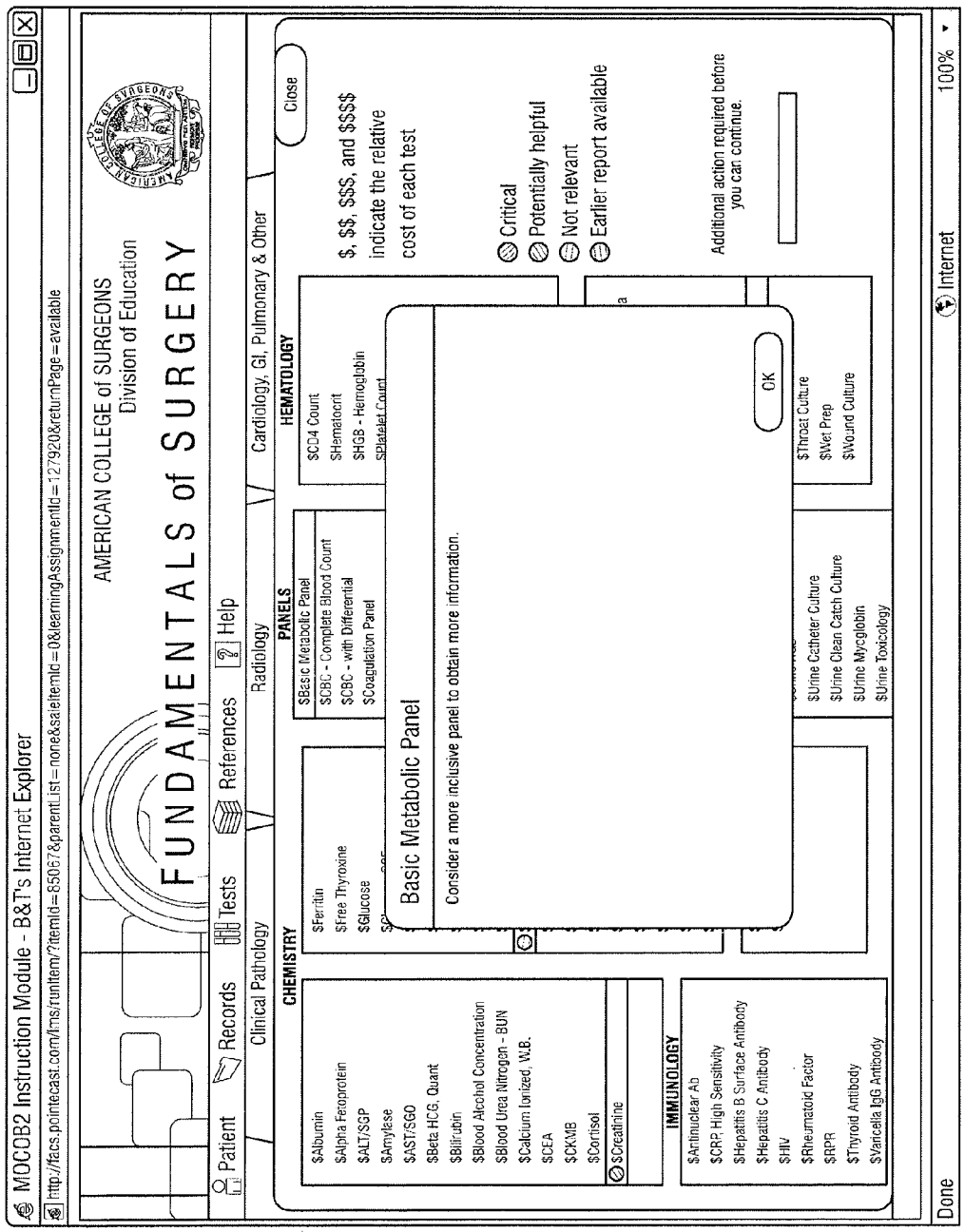

FIG. 30 shows an example screen shot that may be presented to the learner upon selecting the "ok" button in FIG. 29. In this example, the learner is provided with feedback that the test for "stool for ova and parasites" is not relevant by notating this test with a red indicator. Also in FIG. 30, even though the learner has performed a test, the status indicator has not changed because the test ordered by the learner was not relevant.

Figure 31:
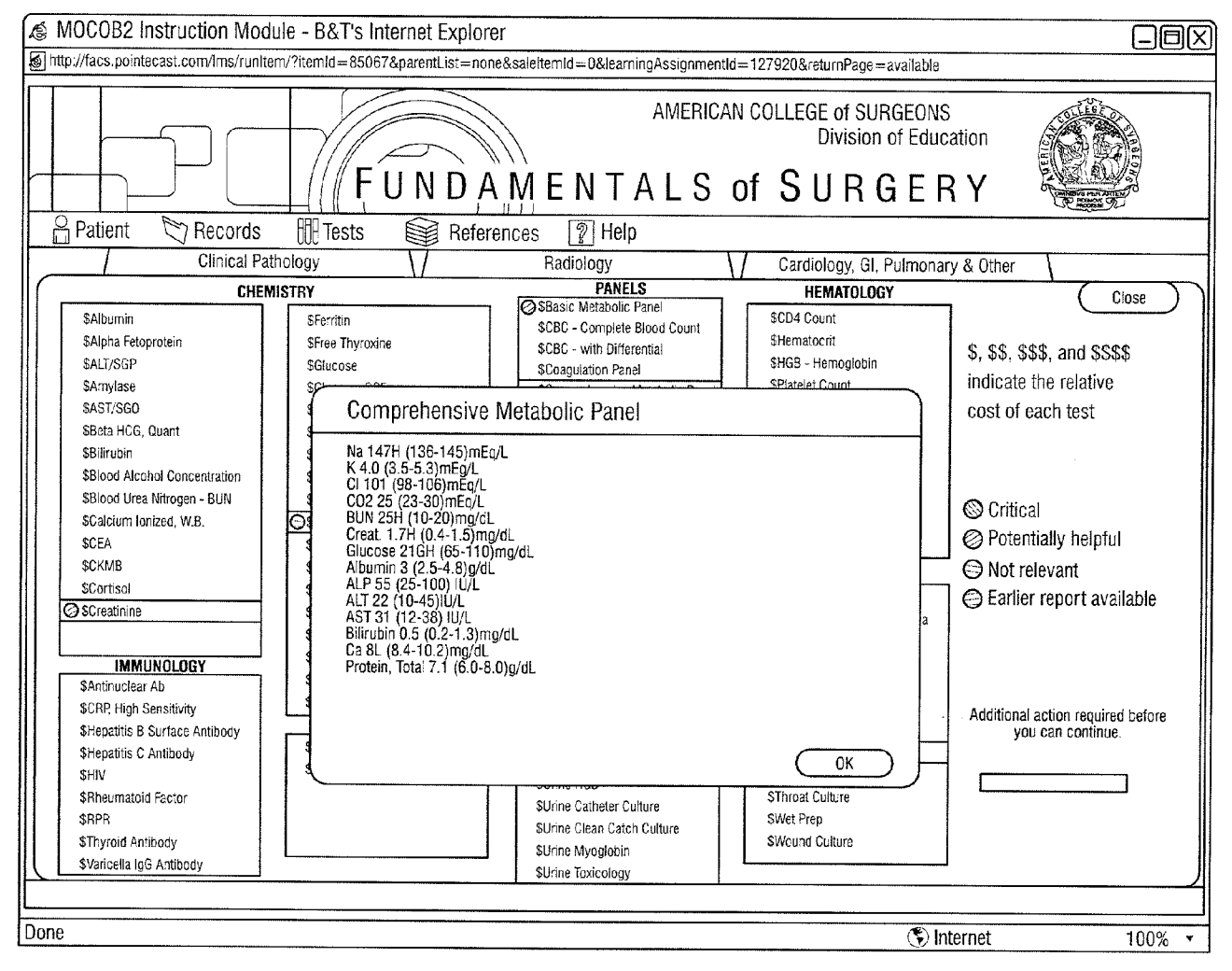

FIG. 31 shows an example screen shot that may be presented to the learner upon selecting "basic metabolic panel." The learner is provided with feedback indicating that he/she should consider a more inclusive panel to obtain more information. The learner may continue ordering additional tests by selecting the "ok" button.

Figure 32:
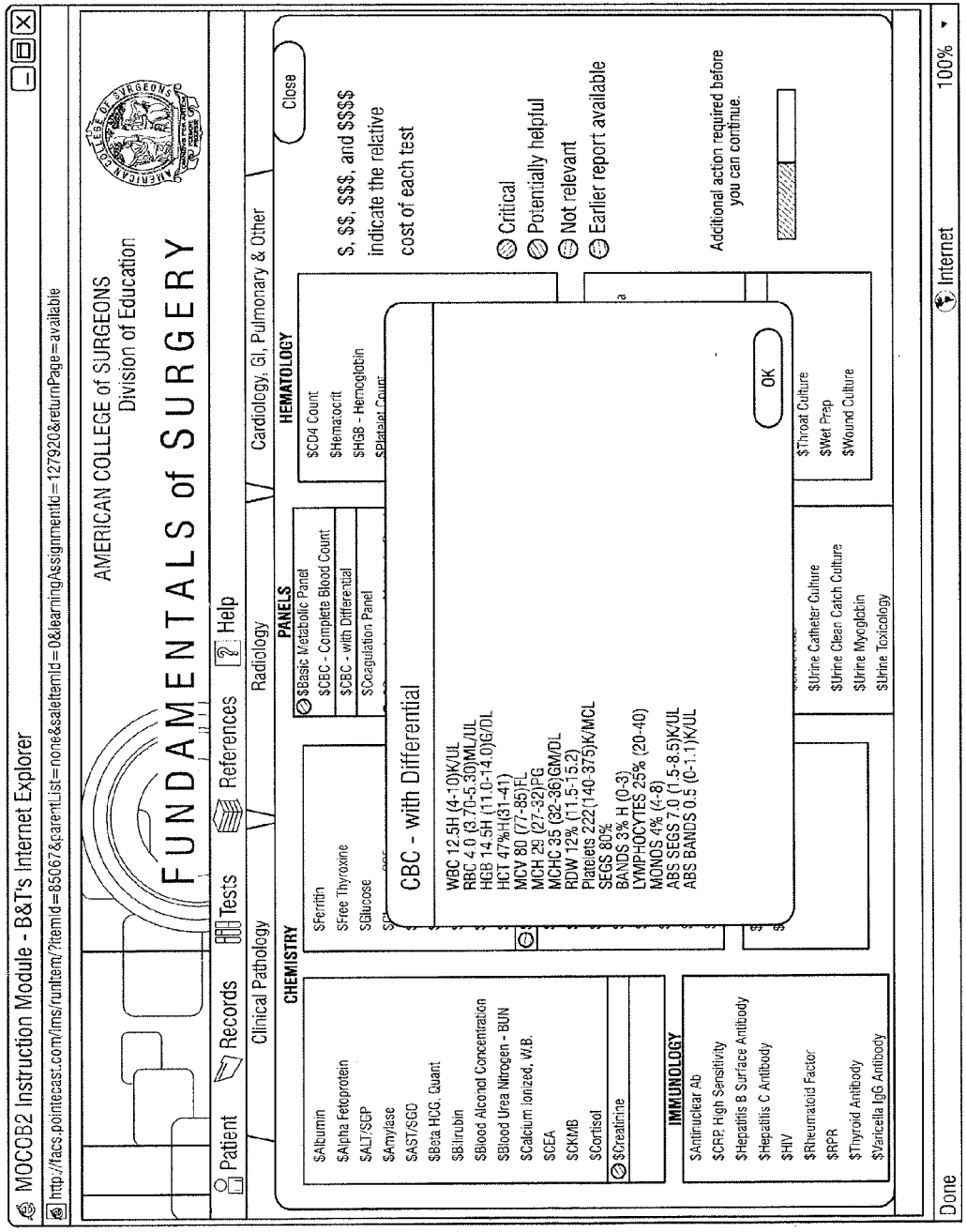

FIG. 32 shows an example screen shot that may be presented to the learner upon selecting "comprehensive metabolic panel." The learner is provided with the results of this panel for them to consider. To continue, the learner would select the "ok" button.

Figure 33:
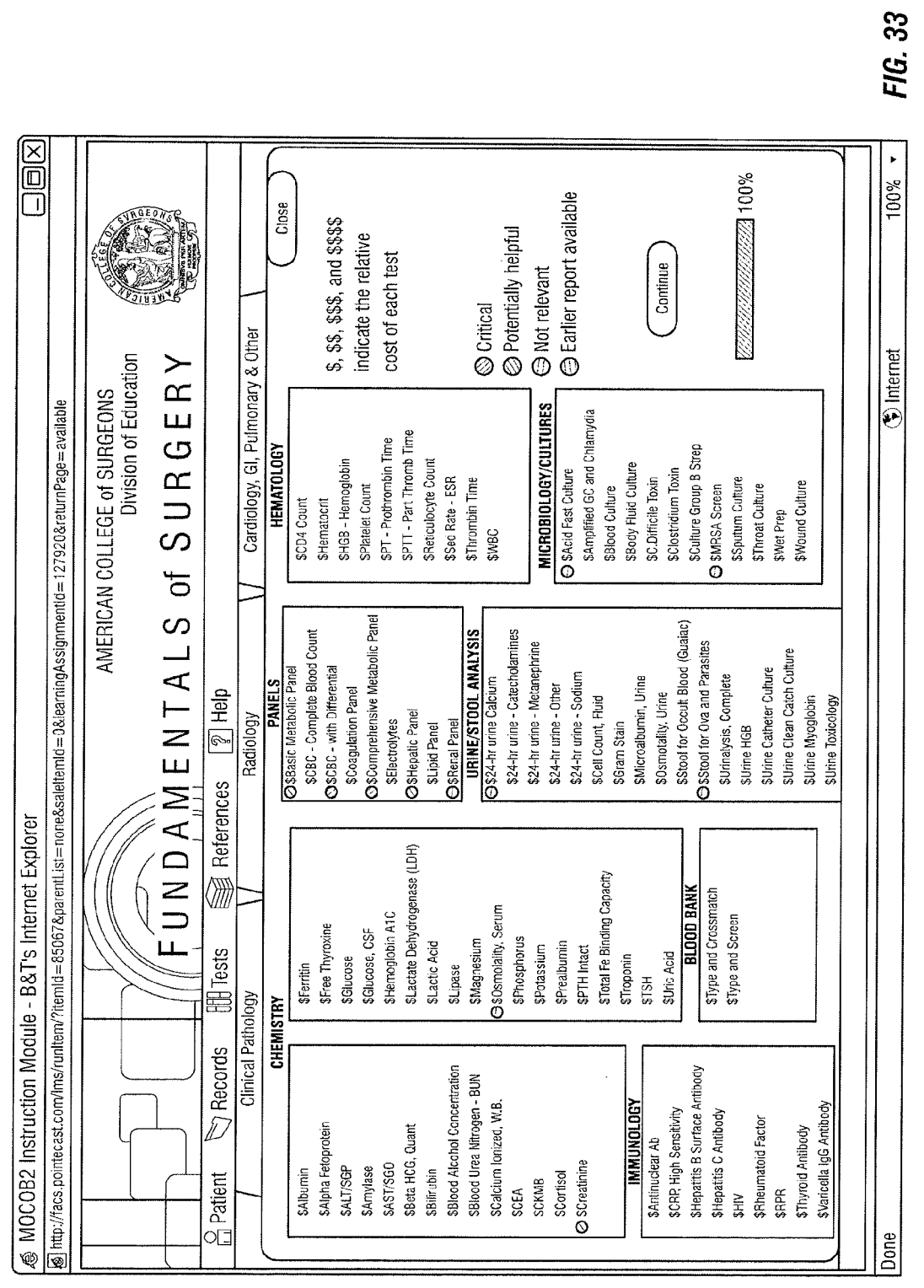

FIG. 33 shows an example screen shot that may be presented to the learner upon selecting "CBC-with differential." This screen shot shows the learner the results of this test which may be considered by the learner in determining a diagnosis. To continue, the learner would select the "ok" button.

Figure 34:
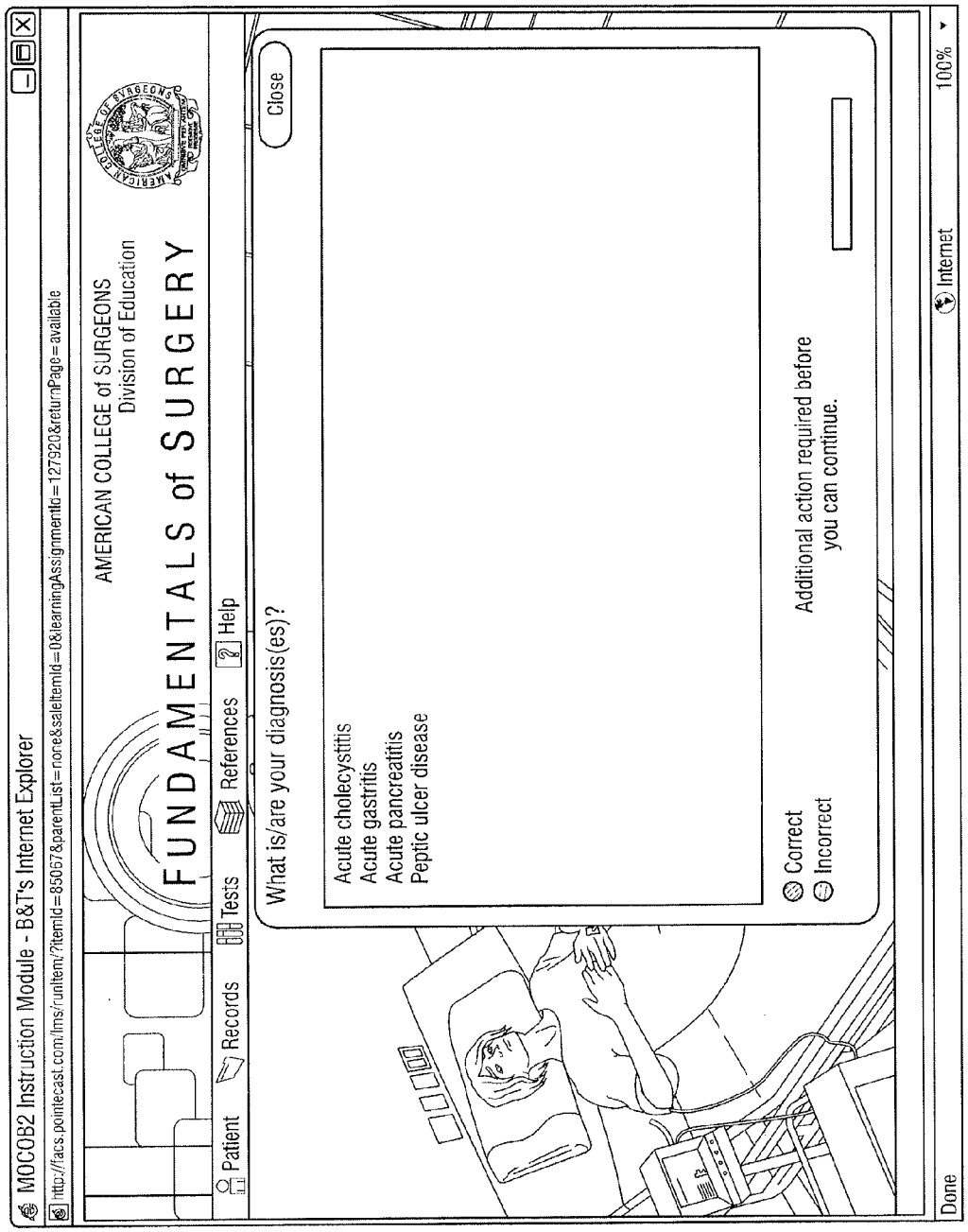

FIG. 34 shows an example screen shot that may be presented to the learner after the learner has ordered a number of tests. As can be seen in this example, a number of the tests were not relevant, which could be notated by a red indicator.

A couple of the tests were potentially helpful, which could be notated by a yellow indicator. Also, two of the tests were determined to be critical which could be notated by a green indicator. Since the learner has selected the two critical tests necessary to proceed further in this scenario, the status indicator shows the user has progressed to 100% of this portion and may proceed by selecting the "continue" button.

Figure 35:
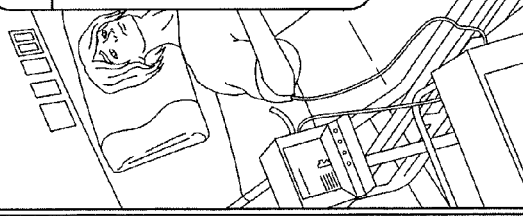

FIG. 35 shows an example screen shot that may be presented to the learner which asks the learner for a diagnosis. The learner in this example is presented with four potential diagnoses, some of which may be right and others may be incorrect. There may be more than one correct answer for the learner to consider.

Figure 36:
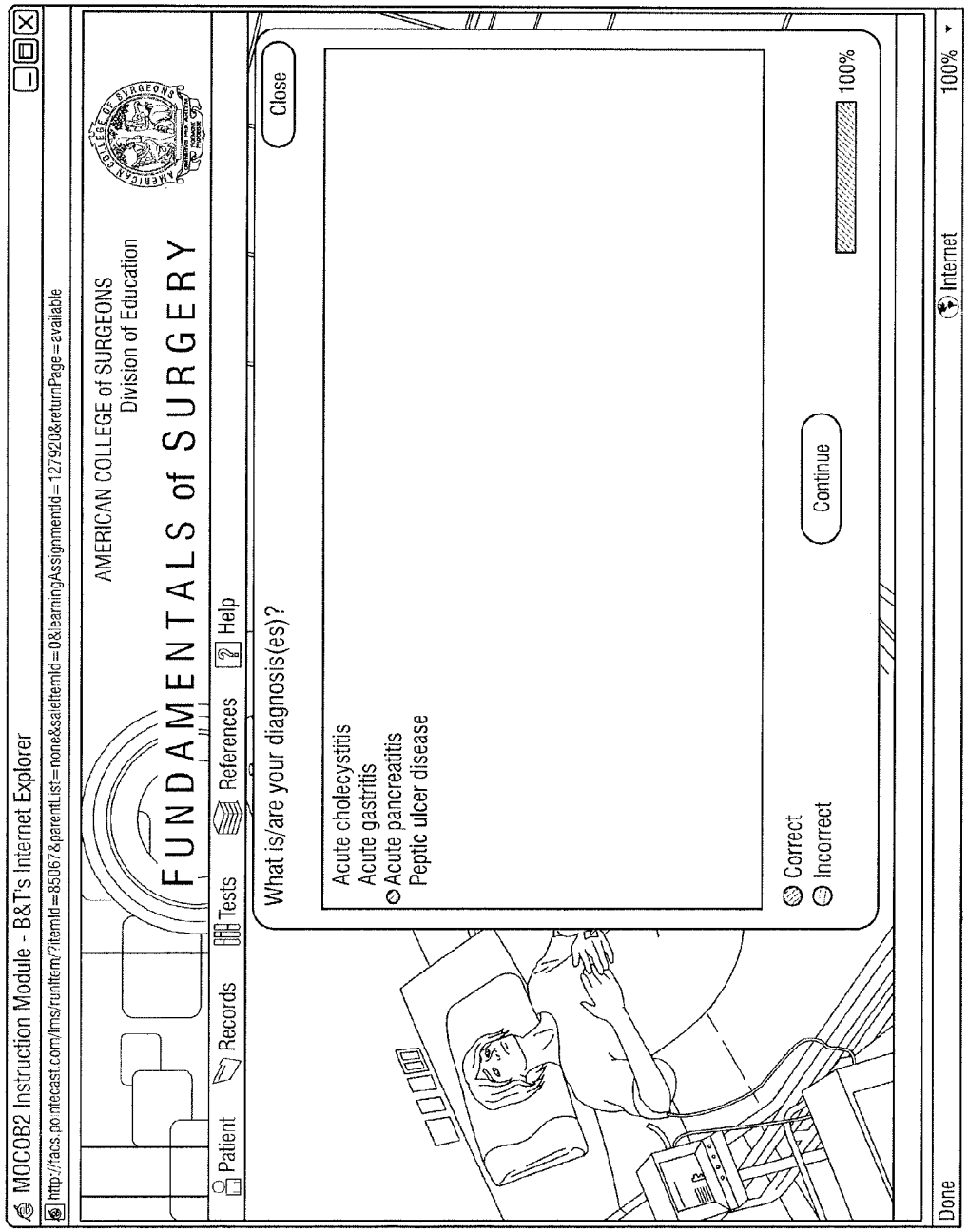

FIG. 36 shows an example screen shot that could be presented to the learner upon selecting "acute pancreatitis." In response to this selection, the learner is provided with positive feedback that acute pancreatitis presents in this fashion. Additionally, the learner is provided with additional information that helps the learner understand the rationale for this being a correct diagnosis. To continue, the learner would select the "ok" button.

Figure 37:

FIG. 37 shows an example screen shot that may be presented to the learner upon selecting the "ok" button in FIG. 36. In this example, the user selection of acute pancreatitis is notated by a green indicator, which means that this is a correct diagnosis. As a result, the status indicator is at 100% since a single diagnosis is needed to continue further in this scenario in this example. Accordingly, the learner is presented with a "continue" button for the learner to proceed.

Figure 38:
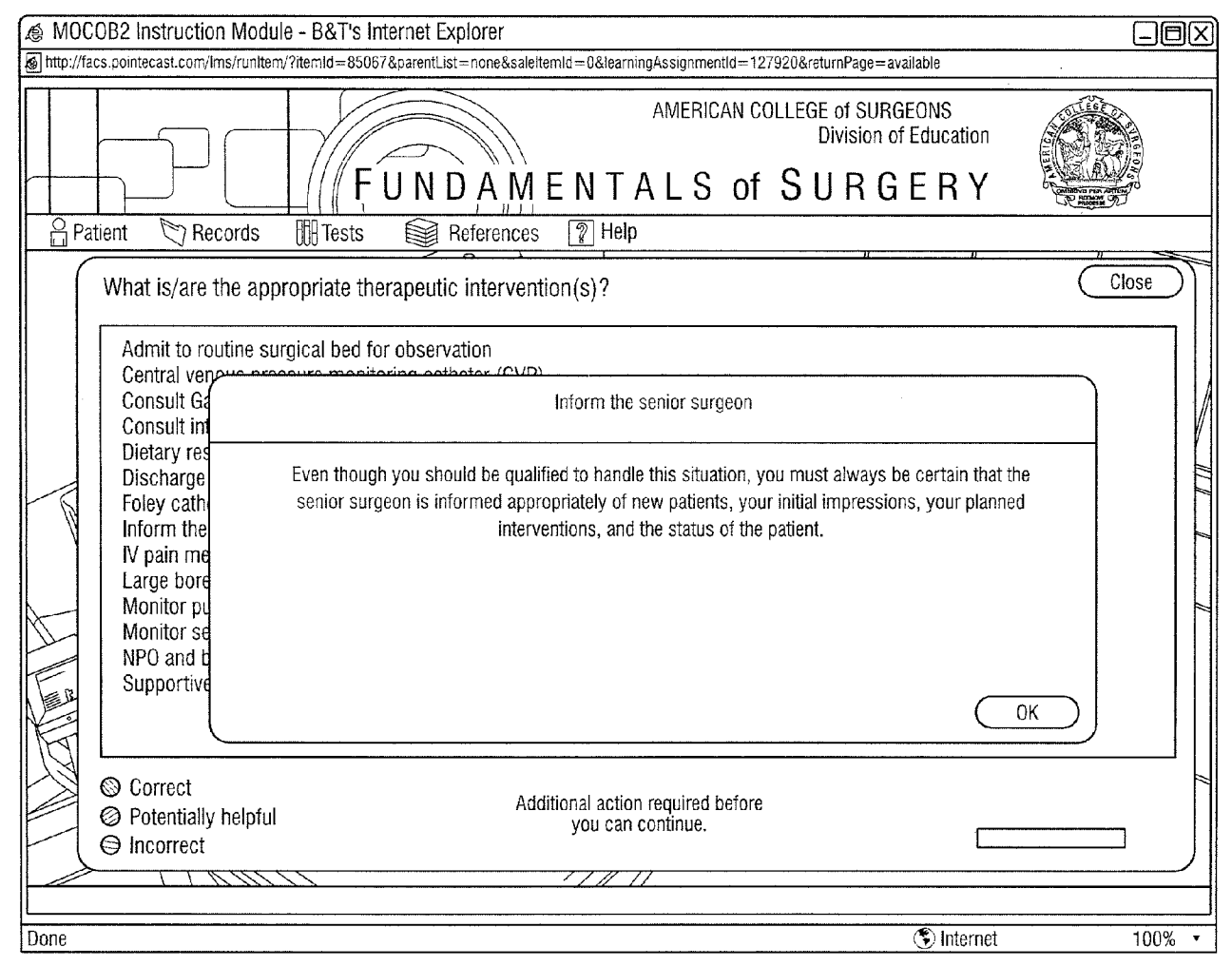

FIG. 38 shows an example screen shot that may be presented to the learner upon selecting the "continue" button in FIG. 37. In this example, the learner is provided an explanation regarding potential therapeutic intervention that may result from the diagnosis. The learner in this example would select the "ok" button to continue further in this scenario.

Figure 39:

FIG. 39 shows an example screen shot that may be presented to the learner upon selecting the "ok" button in FIG. 38. In this example, the learner is presented with a plurality of possible therapeutic interventions, some of which are correct, potentially helpful, or incorrect. A status indicator is provided so the learner knows when he/she has progressed sufficiently to proceed with the scenario. In this example, the status indicator shows that additional action is required before the learner may continue.

Figure 40:
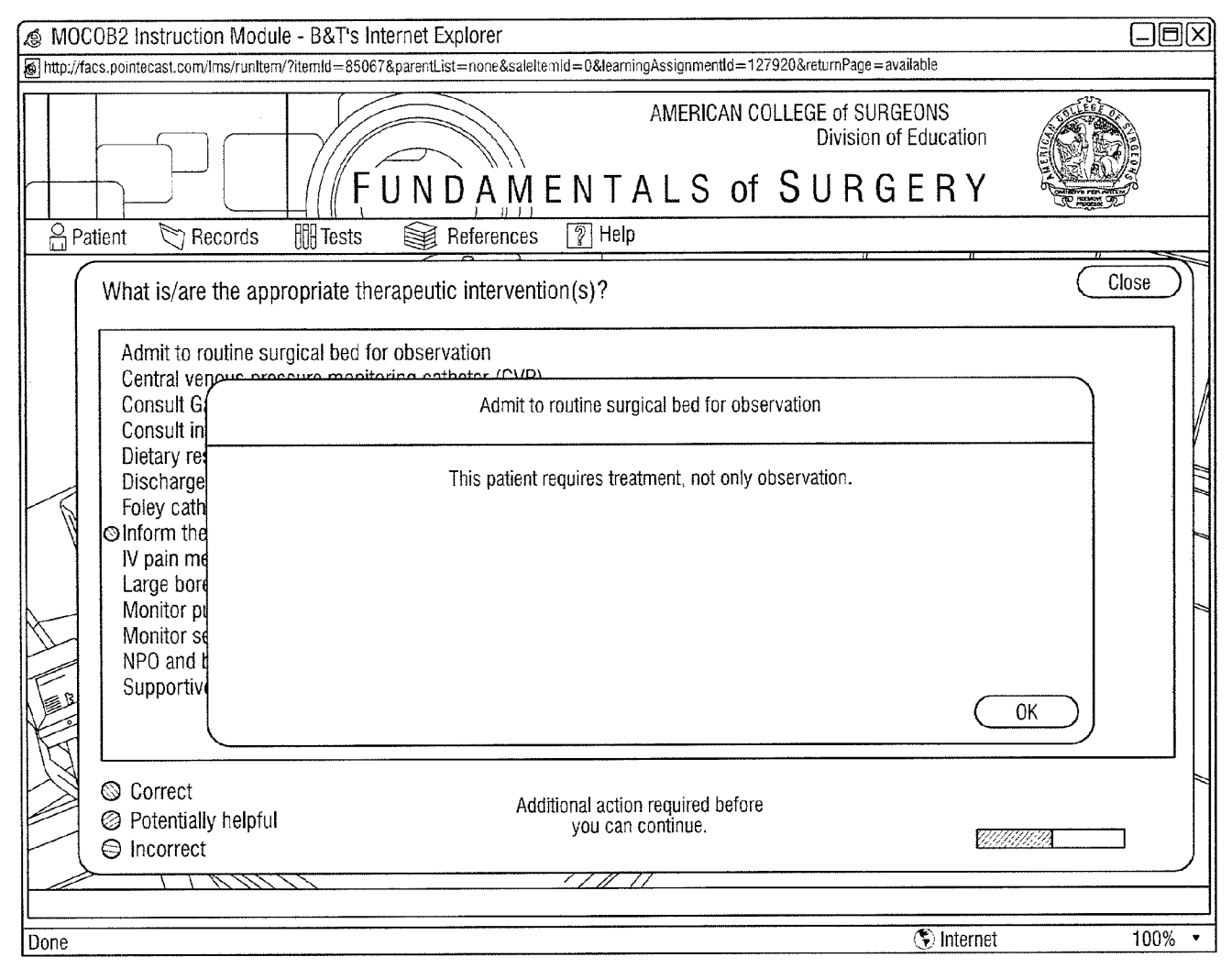

FIG. 40 shows an example screen shot that may be presented to the learner upon selecting the answer "inform the senior surgeon." In this example, the learner is provided with relevant information indicating that this answer is correct and providing a rationale for why the answer is correct.

FIG. 41 shows an example screen shot that may be presented to the learner upon selecting the "ok" button from FIG. 40. Since the learner's answer was correct, the answer is notated with a green indicator and the status indicator has progressed, but shows that the learner still has additional action to proceed further.

Figure 42:

FIG. 42 shows an example screen shot that may be presented to the learner upon selecting the answer "admit to routine surgical bed for observation." Here, the learner is provided with information that the patient requires treatment, not only observation.

Figure 43:

FIG. 43 shows an example screen shot upon the learner selecting the "ok" button in FIG. 42. As shown in this example, the answer "admit to routine surgical bed for observation" was incorrect, which could be notated by a red indicator. Since this was an incorrect therapeutic intervention, the status indicator has not progressed.

Figure 44:
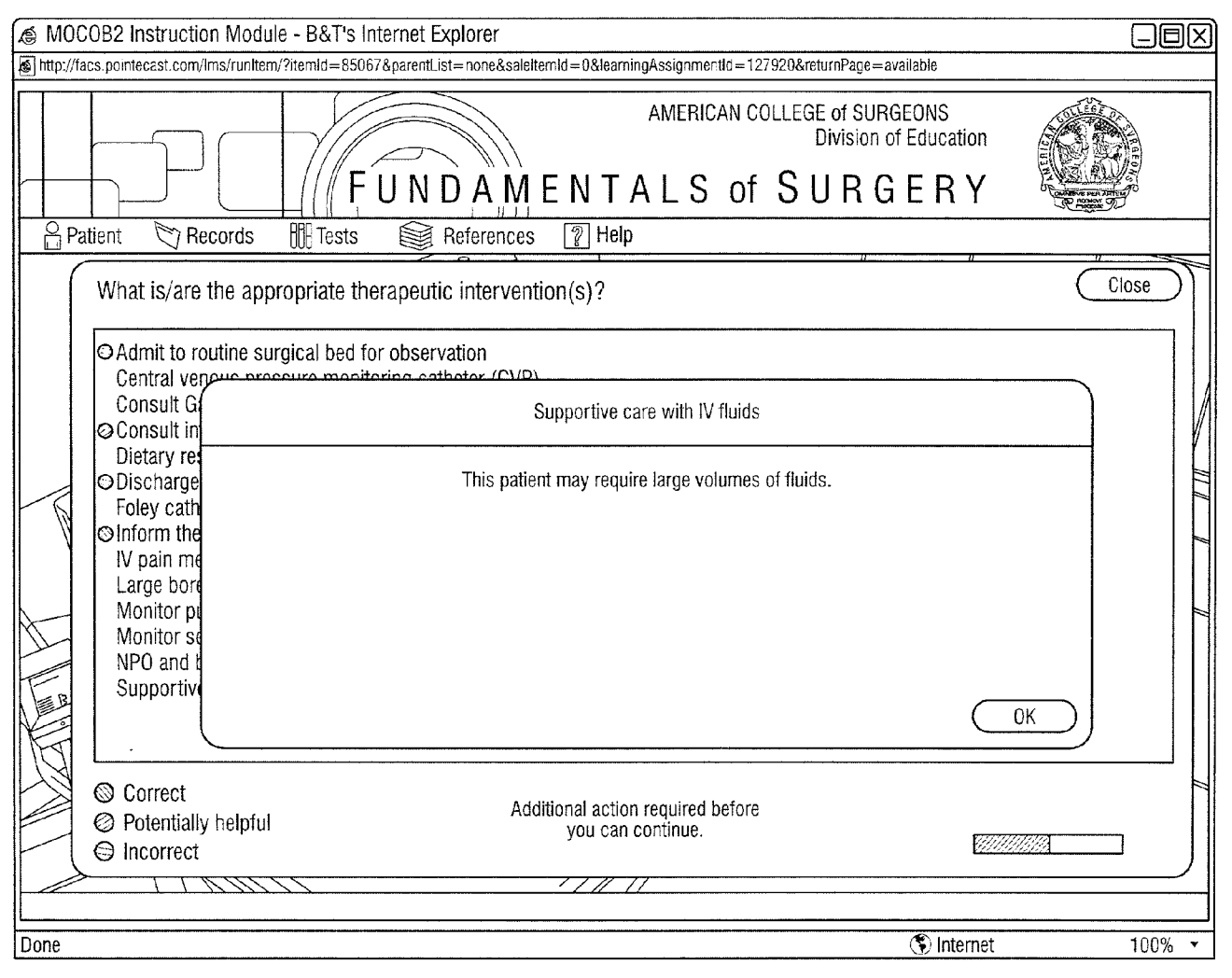

FIG. 44 shows an example screen shot that may be presented to the learner upon selecting the answer "discharge home on oral antibiotics." The learner is provided with feedback that the patient is much too ill for this answer to be correct and provides an explanation as to what may happen if the learner had proceeded in this manner.

FIG. 45 shows an example screen shot that may be presented to the learner upon selecting the answer "consult internist or other primary care MD for long term follow up care and possible cholesterol reducing medication." Here, the learner is provided with feedback that this may be potentially helpful, but not a correct answer.

Figure 46:
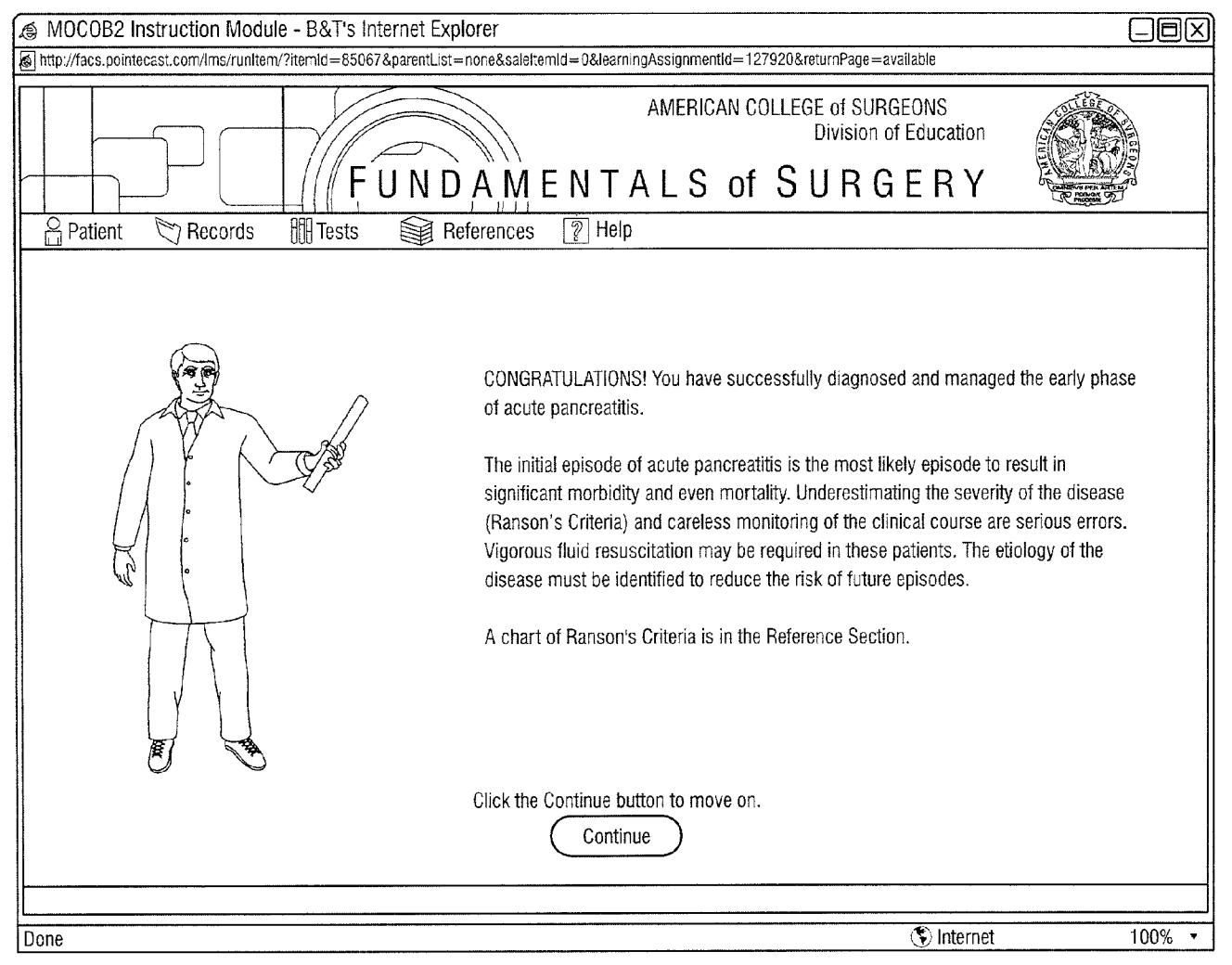

FIG. 46 shows an example screen shot that may be presented to the learner upon selecting the answer "supported care with IV fluids." In response, the learner is provided with feedback that this patient may require large volumes of fluids.

Figure 47:
Figure 48:
Figure 49:
Figure 50:
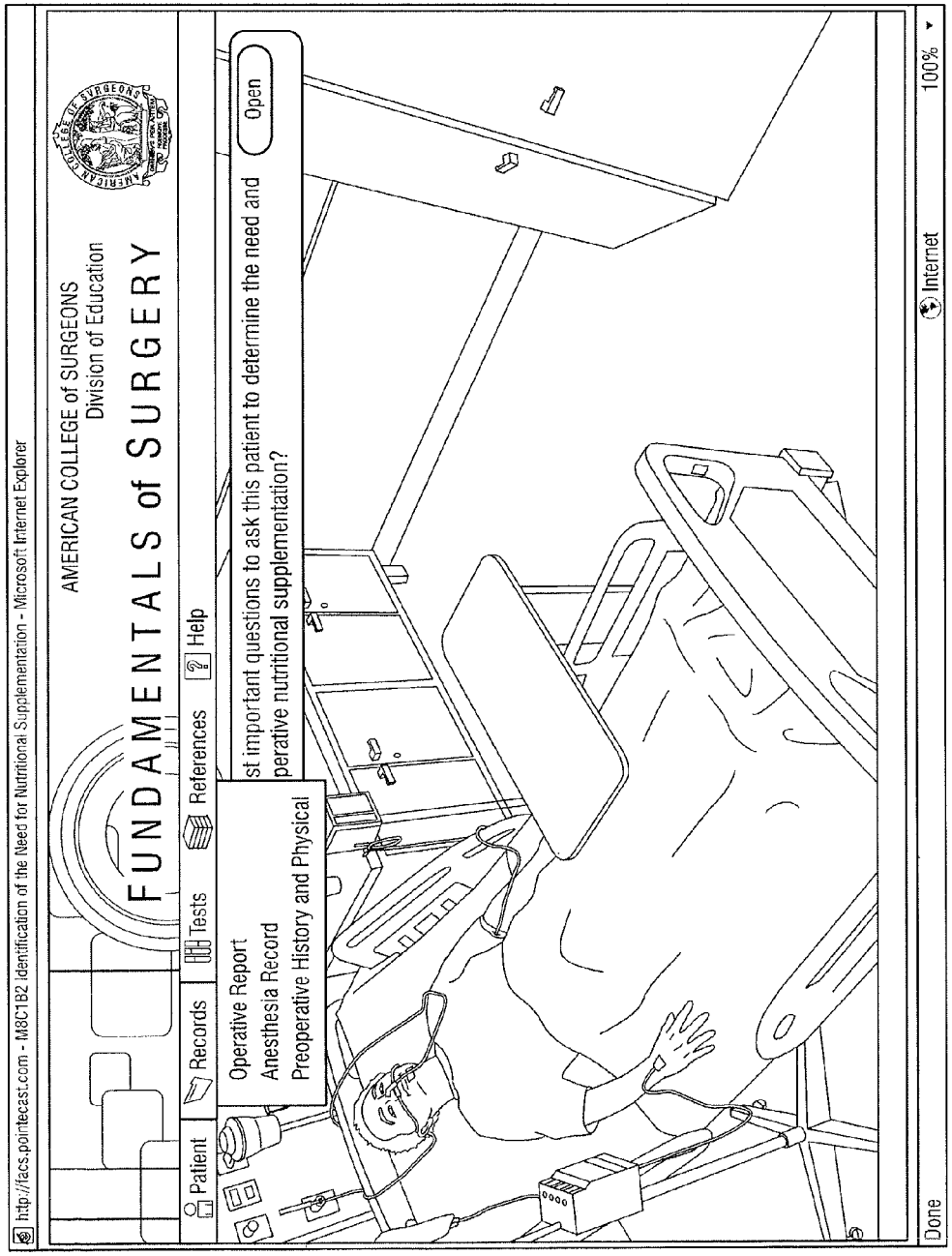
Figure 52:
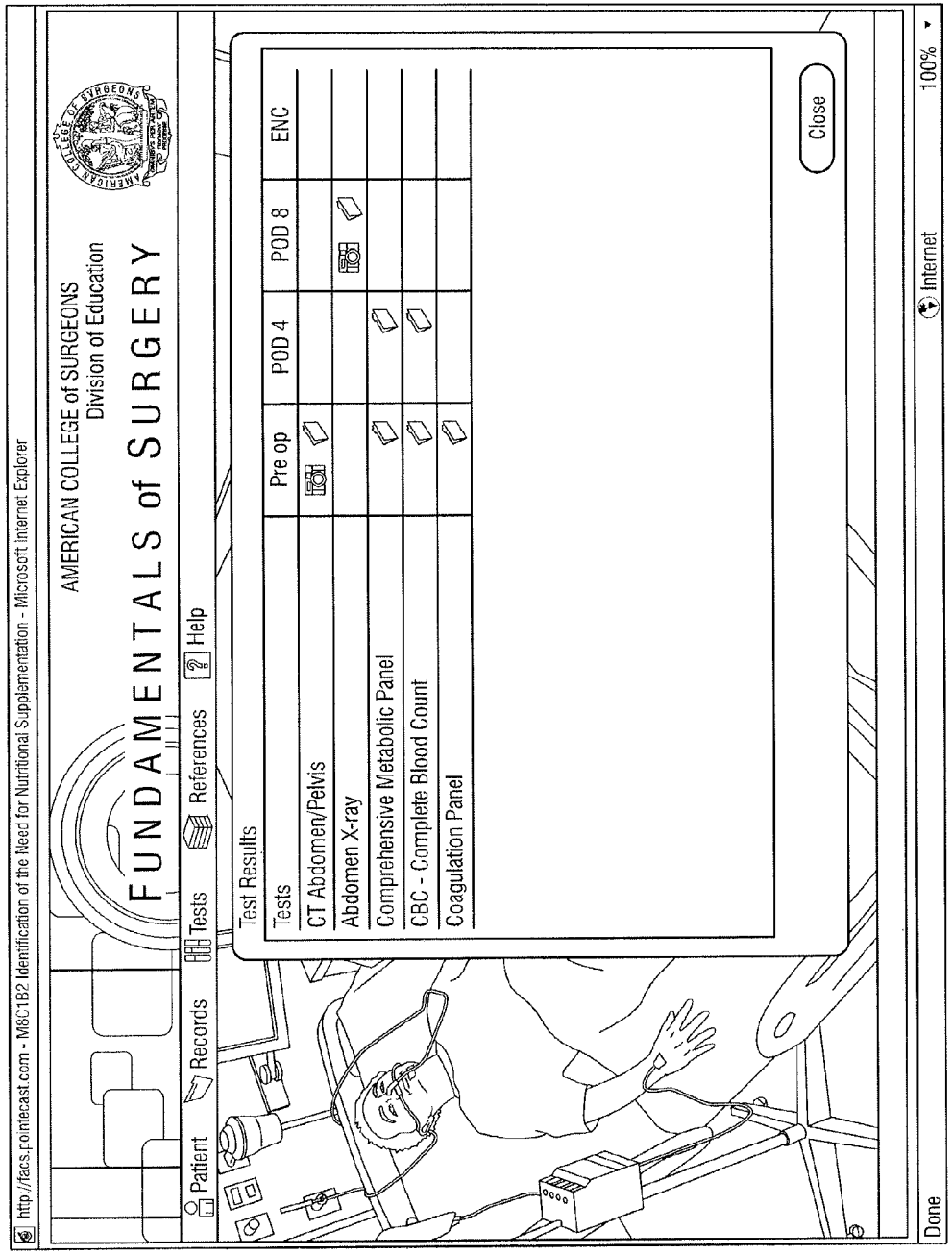
FIGS. 52 through 57 are screen shots showing example information that could be available to the learner.
Figure 53:
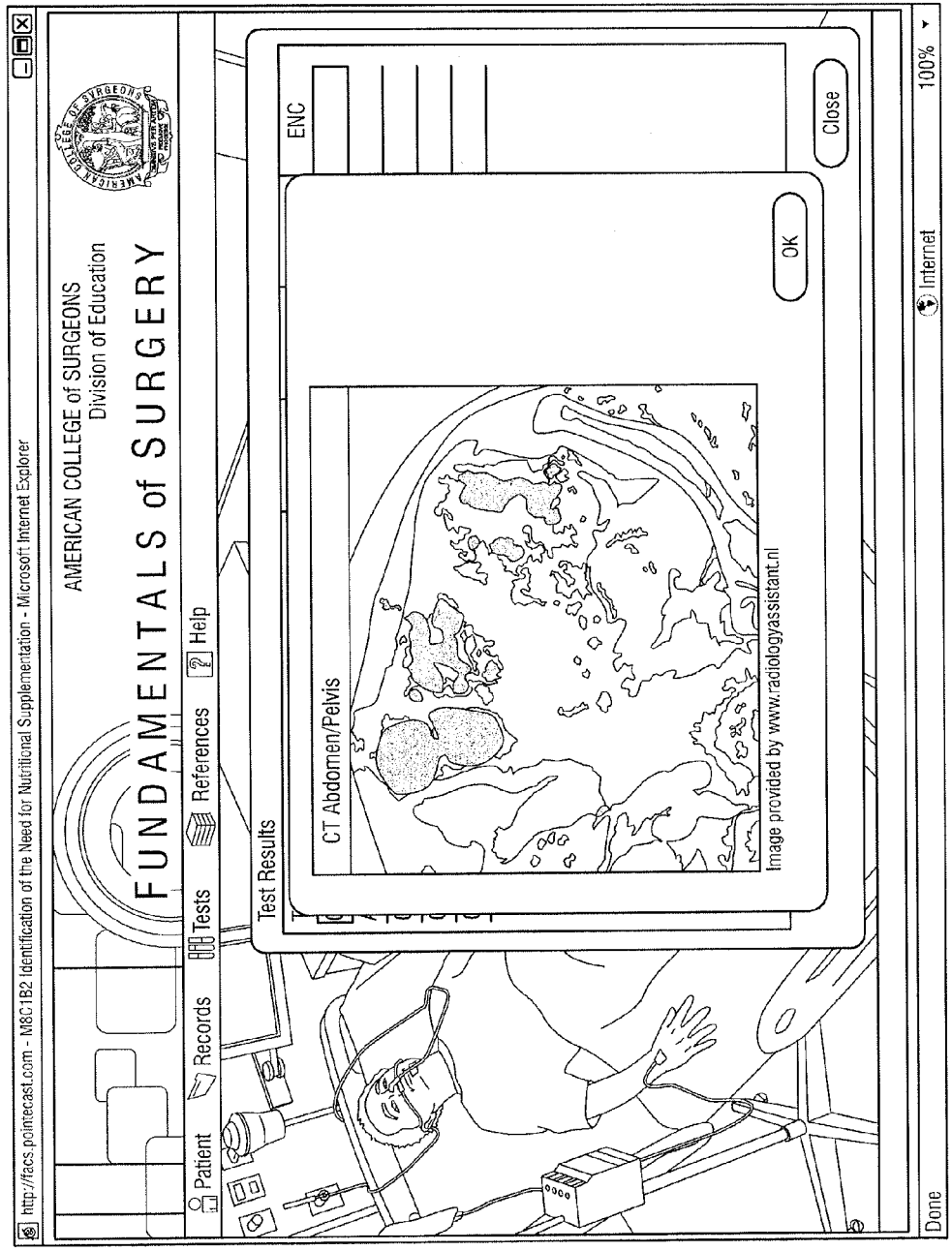
Figure 54:
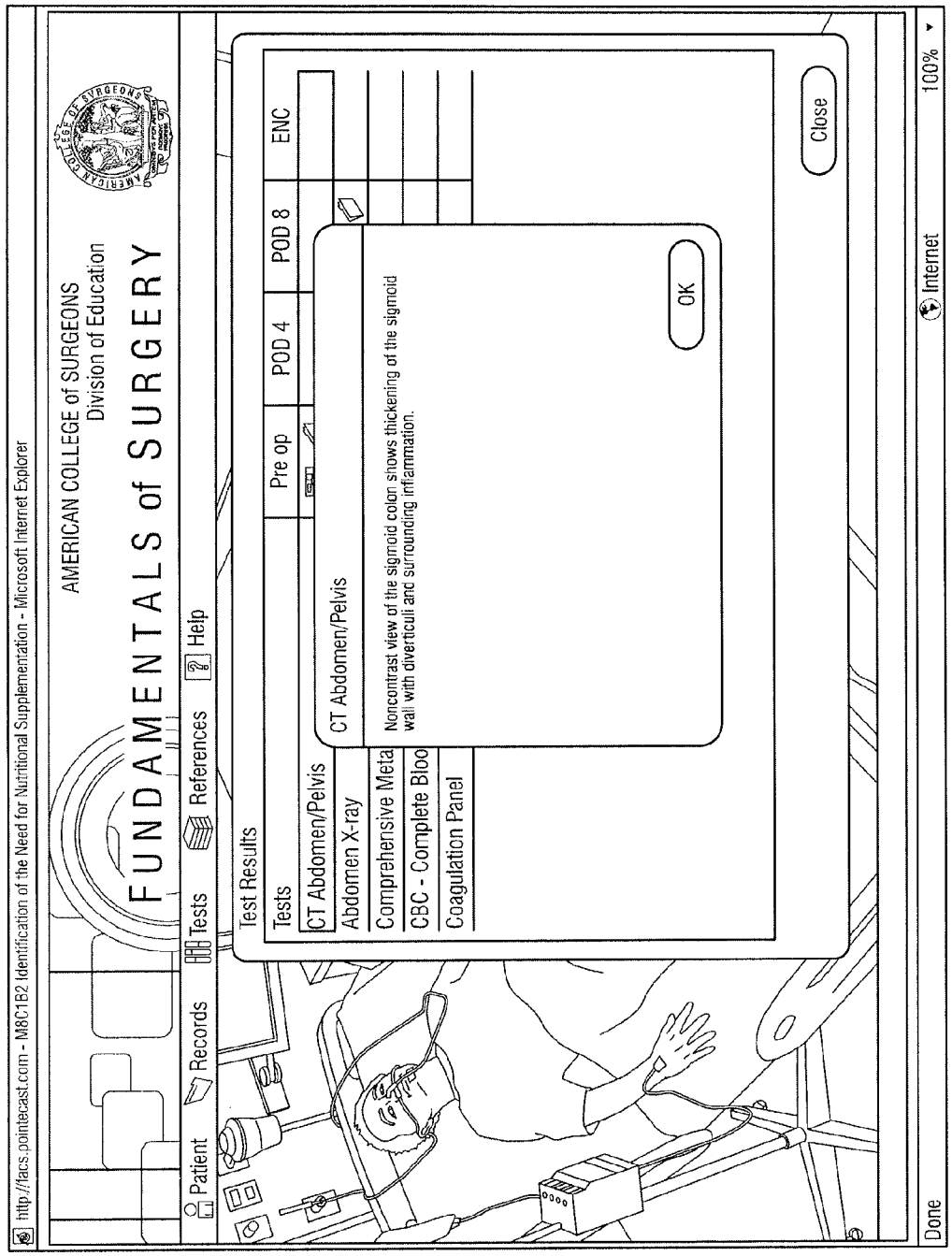
Figure 55:
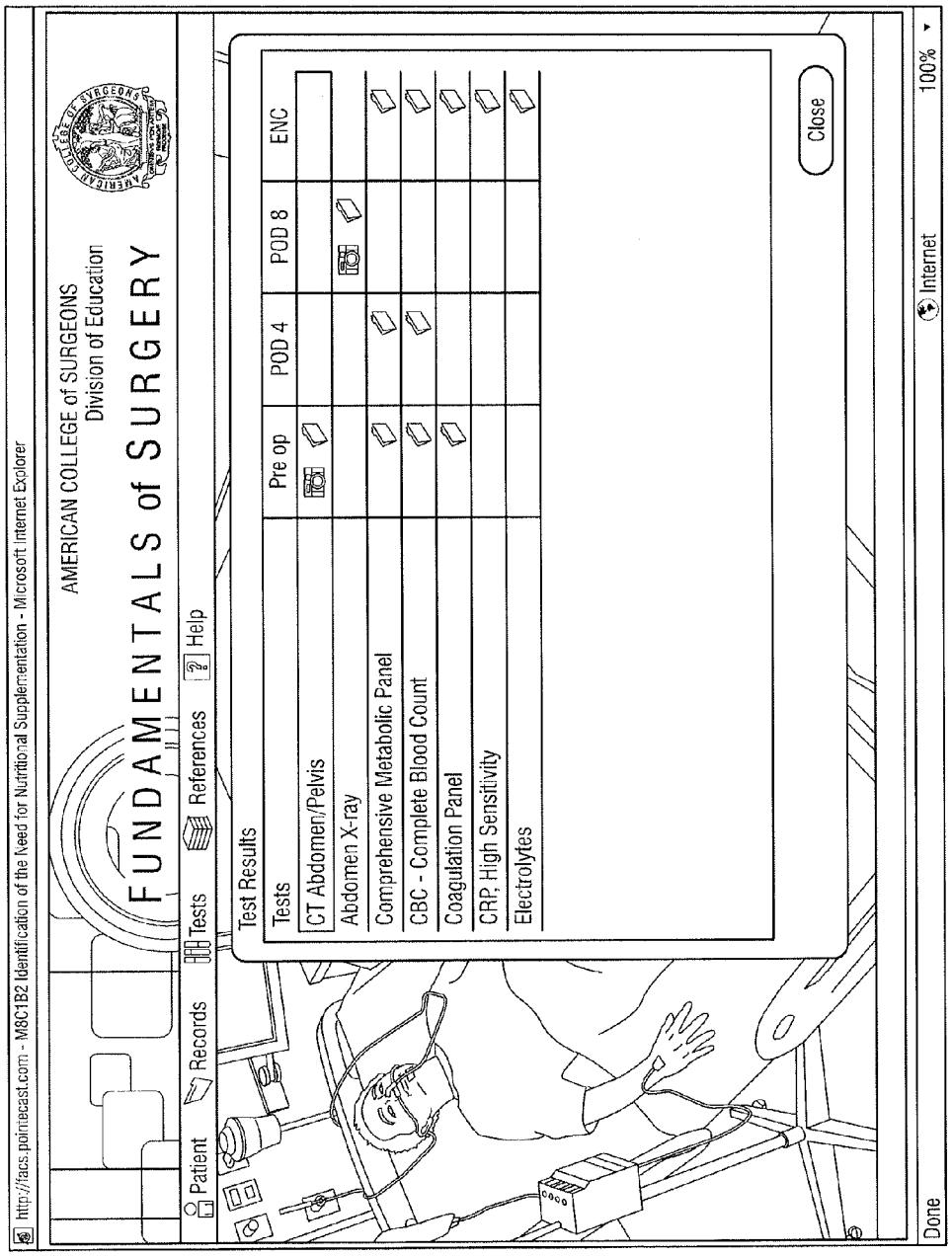
Figure 56:
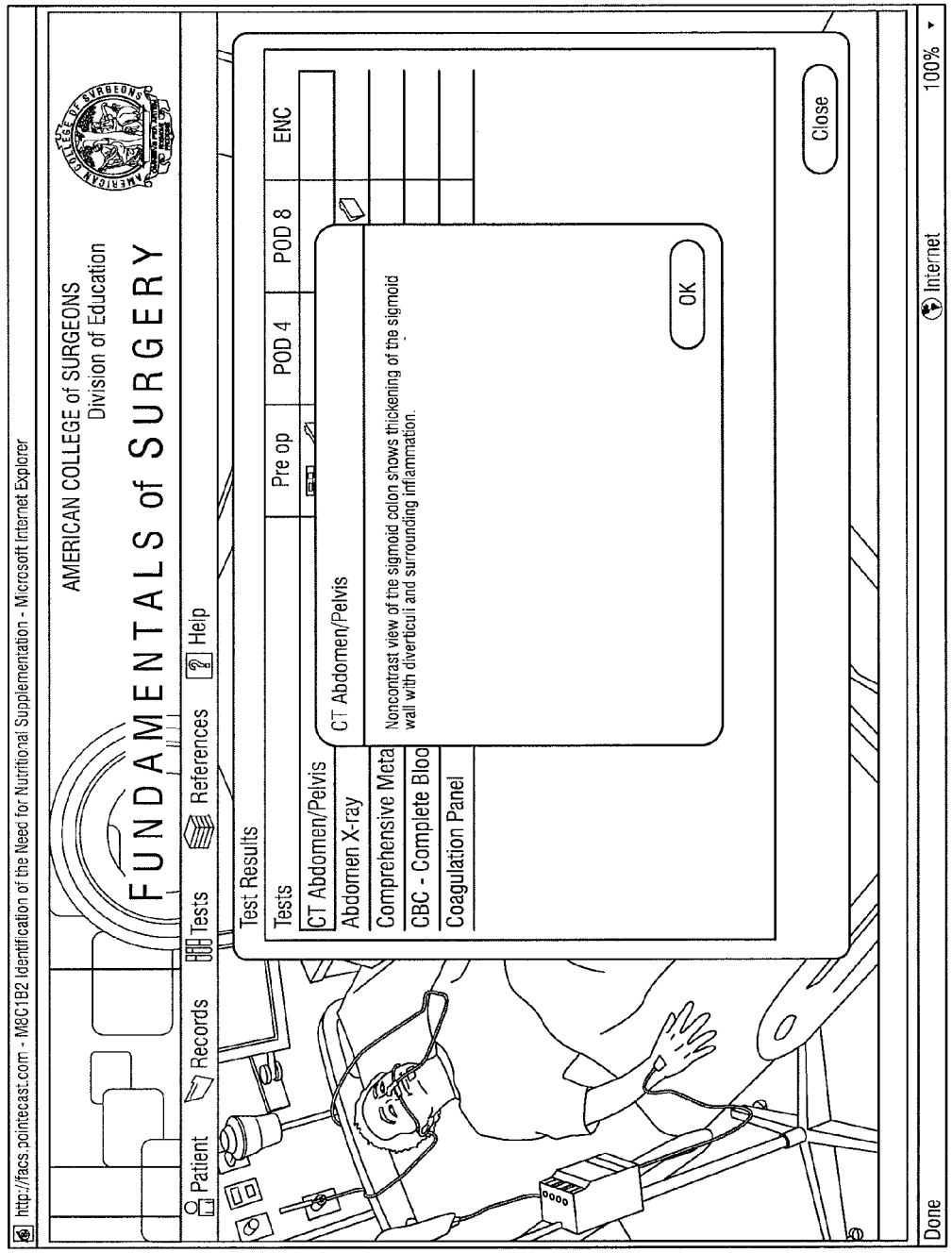
Figure 57:
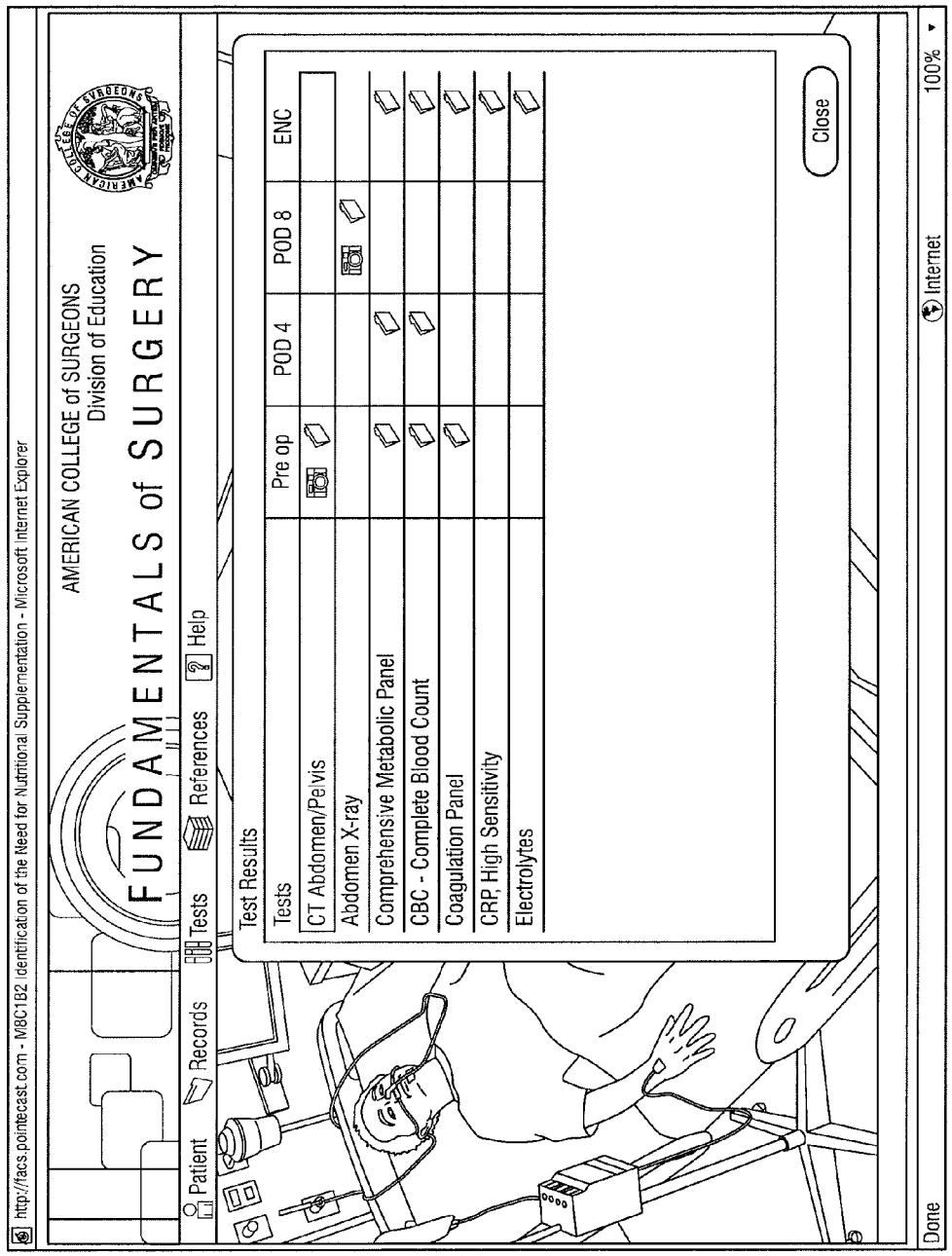
Figure 58:
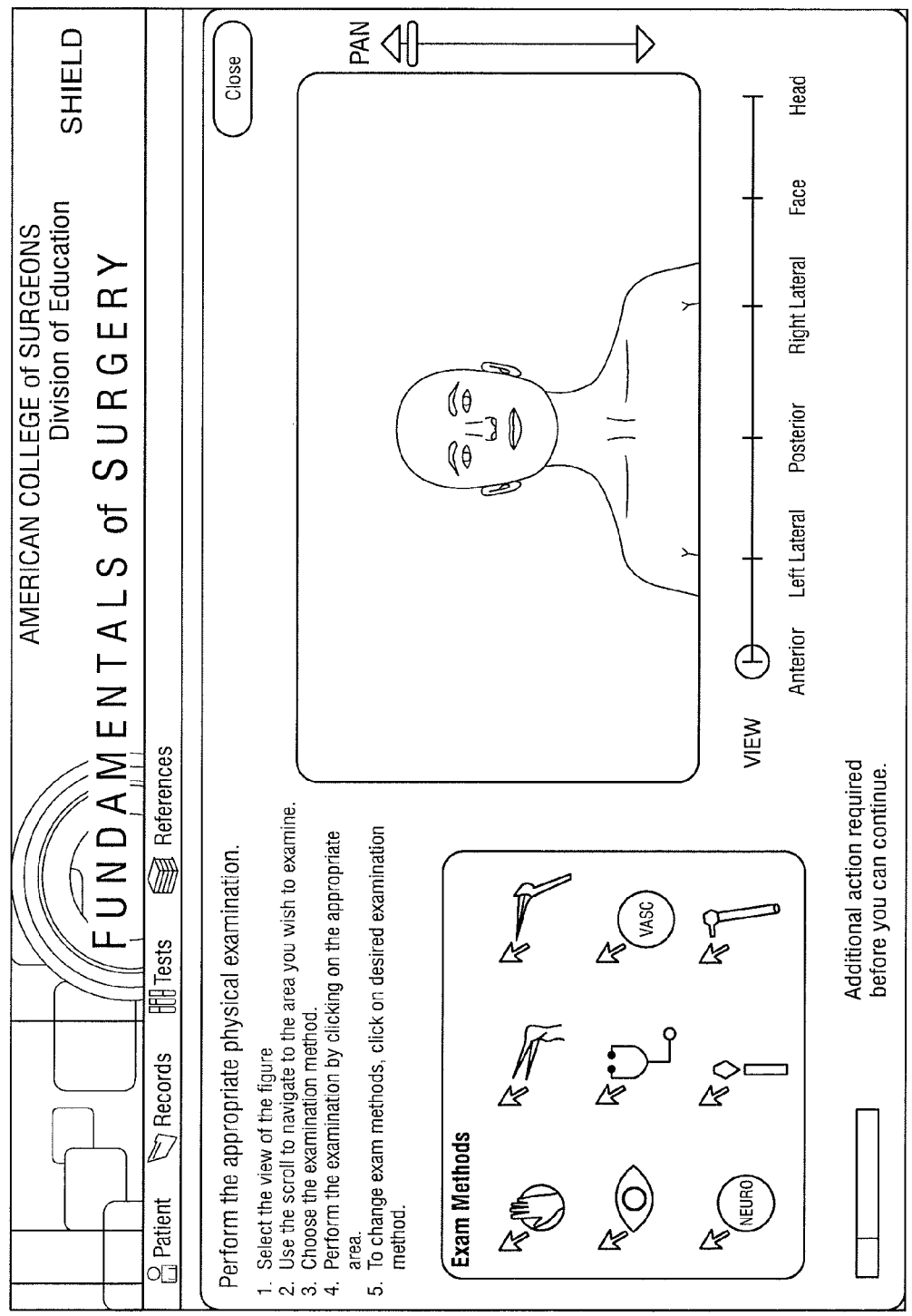
Figure 59:
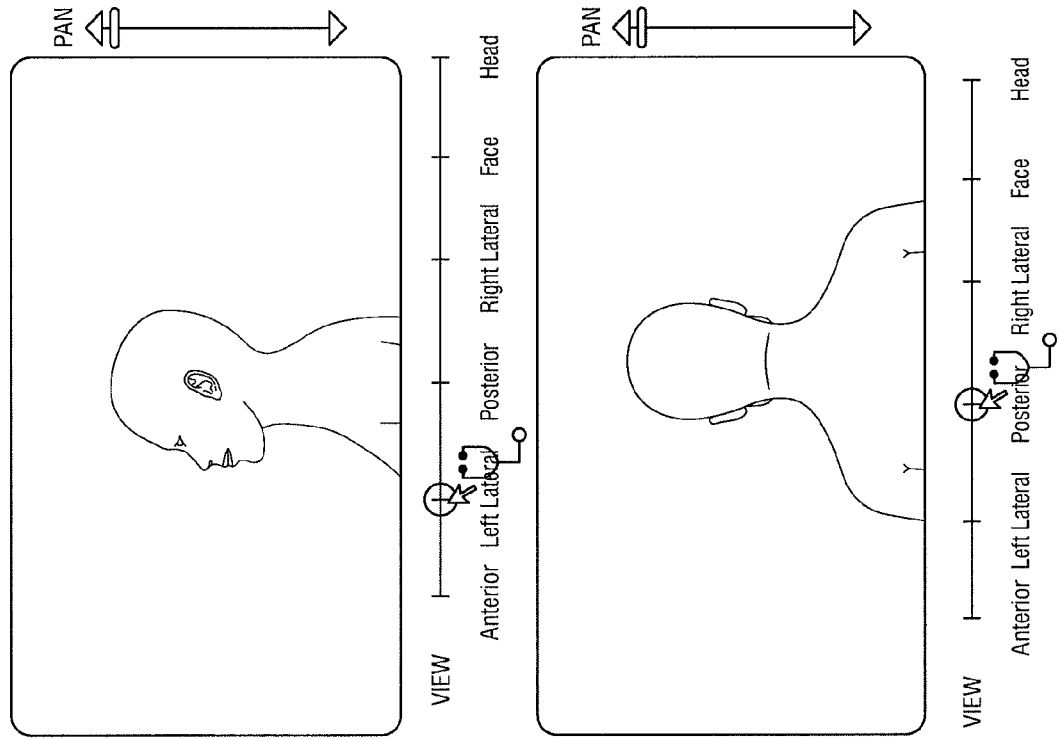
Figure 61:
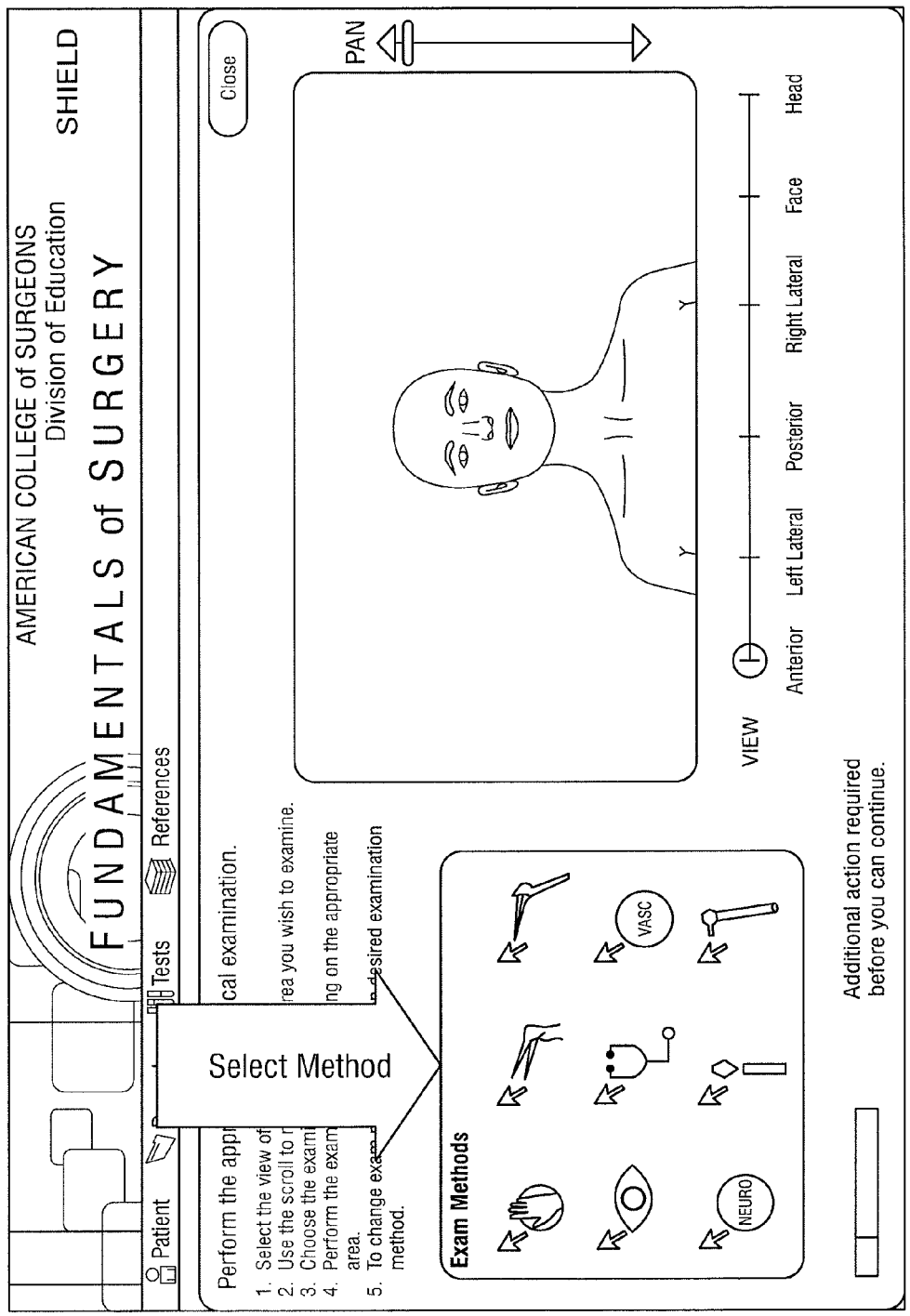
Figure 62:
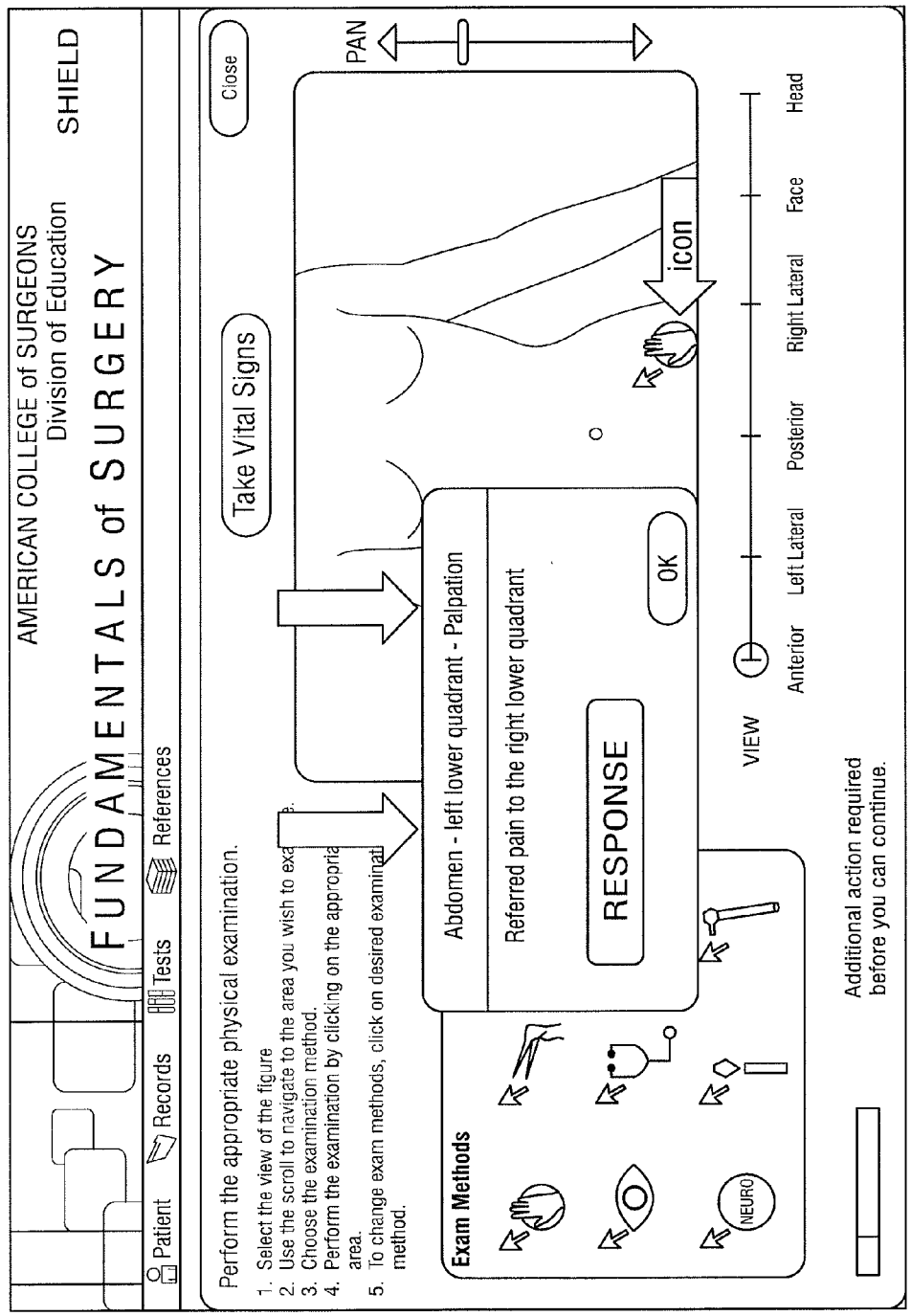

FIG. 47 shows an example screen shot that may be presented to the learner upon selecting the "ok" button in FIG. 46. As seen in this example screen shot, a variety of answers that were made by the learner have indicators notating whether each of the selected answers was correct, potentially helpful, or incorrect. Since the learner has identified the two correct answers, the status indicator is now at 100% and the "continue" button appears so that the learner may proceed further.

Figure 51:
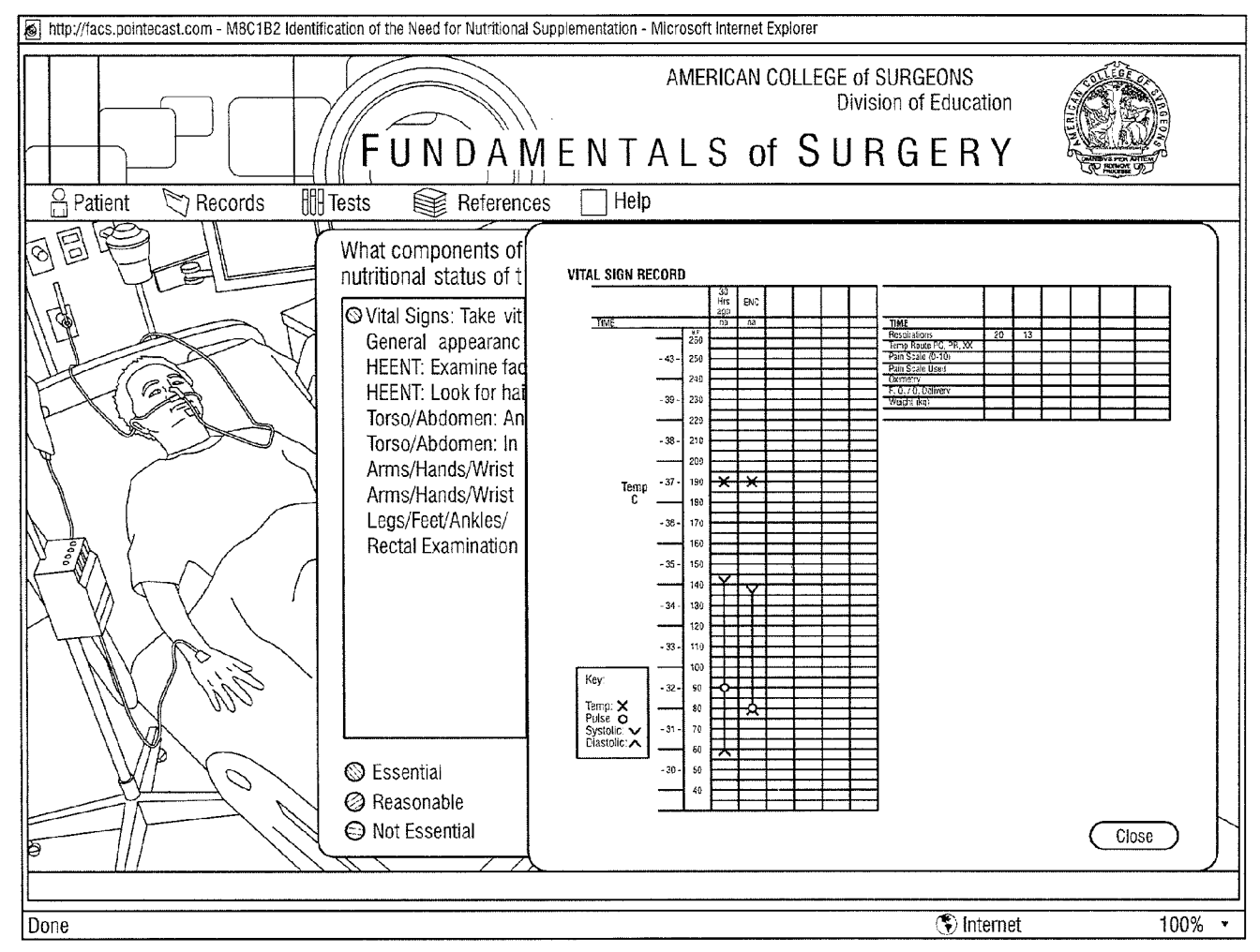

FIGS. 48 through 51 explain to the learner that the scenario has been completed and provides additional information regarding what the learner should have learned through this scenario. Additionally, the learner is provided with a specific reference material that is relevant to this scenario. Moreover, as seen in FIG. 51, the number of indicators was tracked so that the learner knows whether the scenario should be repeated until it is mastered.

Another aspect of the present disclosure is an authoring process that allows persons without any knowledge of programming languages to develop branches (also described as scenarios or cases herein) that are interactive, such as the example scenario shown in FIGS. 2 through 51. In some embodiments, interchangeable blocks or templates of material are provided that allow a person, such as a physician, to develop scenarios from which interface screens and interactions can be developed by a programmer. This creates a substantial efficiency in communication between an author and a programmer, which allows the scenarios to be developed more rapidly and in a much more cost-effective fashion. Additionally, the interchangeable blocks or templates can be used in different sequences to create various scenarios. This allows tremendous freedom and "pseudo-branching," which means that the program is perceived by learners as non-linear, but from the programming perspective it is in fact linear. This gives the illusion of branching without the complexity and expense of its development. The "blocks" are designated by how many categories are available for the responses, whether or not answers "migrate" to the toolbar and the section that is their destination, whether all of a certain group of selections receive an identical response, what happens after successful completion, etc.

Authors have the freedom to select default answers, to create situations requiring a learner to start over, to create mini-scenarios within the branch that the learner must evaluate, to require the learners to perform calculations, etc. When calculations are required, formulae are provided that are retained as references for later use.

A curriculum can be created by one or more authors using the interchangeable blocks. For example, there could be a module within which there could be courses, and within each of the courses there could be branches. The branches may be individual cases or scenarios, such as the example shown in FIGS. 2 through 51, illustrating a particular problem or issue in a topic of interest, such as surgery. In some cases, the author may provide a written learning objective for the module, the course and the branch. Presentation of the learning objective may be withheld until the end of the case if stating it at the beginning would clue the learner about the patient's diagnosis. In some cases, the author may write an outline for each branch that he/she envisions the material to flow within that branch.

In some cases, the author may consider a variety of components that the case should include. For example, in a medical-related scenario, the author may consider when the learner should see the patient. The author may consider asking the learner what questions are important that they ask of the patient, the nurse, or other individuals involved in the patient's care. The author could ask the learner to formulate an initial impression, go through the process of ordering laboratory studies, perform a physical examination to confirm a diagnosis, and/or go through therapeutic interventions to treat the patient. Safety issues or potentially hazardous behaviors may be integrated into a scenario, allowing the learner to experience them in a virtual environment and learn acceptable ways to deal with them.

Based on the learning objective and general outline, the author creates a storyboard using the interchangeable blocks. Typically, the storyboard begins by asking the author to describe the patient setting and the method of notification of the learner that they need to have an interaction with the patient. There is a message either on a pager, or in the chart (or other communication technique), with a description of the patient for the graphic designer, so that the graphic designer can create the appropriate image. In some cases, a plurality of generic individuals could be provided that can be modified to fit these descriptions. In a medical-related scenario, the author could include patient records that should be available. For example, the branch could be created to mimic as closely as possible, the true life chart that the learner could be confronted with, including patient records, operative reports, consultations, previous laboratory data and materials that can be found in the toolbar at the top of each page in the electronic version. The author would use one of the interchangeable blocks to create the material. In some cases, the author may teach the learner that they receive material in variable forms. Sometimes it is easy to read and interpret, and sometimes it is not. This is again part of the learning process for the learner that simulates real life circumstances. For example, there could be existing tests that have been completed prior to this patient encounter that could be accessed by the learner in the branch. Templates are configured so it is extremely easy for an author to present a seemingly identical patient with slightly different history, records, and test results. The author may present a series of scenarios dealing with the same patient at different times in their treatment; and each new scenario contains all of the information gathered in earlier scenarios.

As discussed above, the author may use multiple, interchangeable blocks or templates to develop the storyboard. Each of these blocks have certain specific characteristics that are known to the programmer and will allow them to develop that block into the software version without further interaction from the author. In some embodiments, there may be a text question and then there may be a key to the dots. In the examples shown, green, yellow and red dots are used to indicate the relevance or accuracy of responses. As discussed above, however, the coding of responses could be done in other manners, such as audio feedback, numbers, symbols, letters, etc. Unlike many types of educational systems, this authoring process and resulting system allow for the shades of gray that are ubiquitously present throughout medicine (and possibly other areas in which the system could be used). In many cases, particularly in medicine, there is not sufficient data to know if a particular action is an essential or non-essential part of the assessment or treatment of a patient. For some questions, a response is provided that not only contains factual information, but also contains the thought process of the author. Thus, this leads to a better understanding of why an answer is correct and why things are done. Again, this is a rather unique way of presenting didactic material by incorporating it into a logical thought process, which is generally referred to as "clinical judgment."

These interchangeable blocks allow the author tremendous freedom in creating the pathway by which the branch is developed. For example, the author could have multiple questions in a row; the author could have the laboratory data; or the author could decide he/she would not like to have the laboratory data in the format that is used by most hospitals with physician order entry, but would rather have a list from which the learner selects. For example, the physical examination could be a selection list. Within the laboratory data and pathology and x-ray reports, actual images could be presented which the learner can see and interpret. In real life information comes from a variety of sources. Acknowledging this in these scenarios depicts a respectful relationship with other health professionals. In some cases, for example, a report could be provided without the diagnosis, so that the learner is made to interpret the images. In the laboratory data, for example, learners could be given the actual laboratory data with standard normal values, as well as the appropriately abnormal values for the branch. Within the physical examination, learners could be shown actual physical findings, which may include audio clips (of heart sounds, for example) that the learners listen to and interpret. FIGS. 58 through 62 show an embodiment in which the physical examination could be presented as an image of a male or female that can be viewed from a number of different perspectives and zoom levels combined with a selection of icons that can be used to examine the patient. Using the Grab and drag function, for example, an icon could be placed on the patient image and selected, and the result of that examination will be supplied as text and/or audio and/or image. For example, dragging a stethoscope to the anterior left upper chest and clicking would elicit a report of the lung sounds heard at that place. Dragging a hand to the right upper quadrant of the abdomen would elicit the results of palpating that area.

There could be blocks that provide information within the storyboard that is not in the question format. For example, there could be a block that defines a "pop-up" window where you could see a physician's image and or a nurse's image and the image will actually tell the learner some material that they have become aware of that the learner should know. This is helpful in redirecting the course, for example, and in bringing a unique problem to the attention of the learner. There could also be blocks with text pages where the learners are provided material immediately for the learner in a "need to know fashion." In this manner, the learner does not have to wait to go through the entire course to find the reference and to learn more about that particularly important educational point. There could be blocks in which a link to the reference is provided where the learner may select and can open the reference, or where they can click and actually open the reference and read the entire reference material from either a published source or original material from the author. This makes the program a self-contained program for the learner, so learner(s) can sit with their computers wherever they are and complete the entire branch without needing additional resources or having to have access to additional web sites or Internet connectivity. The reference material remains available to the learner once they have completed a case.

Throughout the storyboard, the function of many of these blocks causes the material to be stored in the toolbar under patient information, laboratory study, etc. Accordingly, all of the information that the learner has learned becomes accessible to them throughout the entire course of managing the patient, which again simulates real life, and they need to know how to access this information and when to access this information. This is part of the learning in this virtual environment that mimics real life. For example, there could be a block that allows the patient to have a cardiac arrest and tells the learner that under these circumstances this patient unfortunately died. In this circumstance, the learner can begin over again, an opportunity that does not exist in real life. This provides as realistic an experience as possible and to occur only at a time when this would indeed occur if a patient was not treated appropriately at that given moment. In some cases, the background could change behind the text message so that, as the storyboard progresses, if the author wants the patient to look different in the images he/she can. For example, the patient could be animated so they can be doing what they would normally be doing, such as flailing around in bed, rubbing their head, doing those things they would do under similar circumstances in real life. Following appropriate action, this behavior would change.

In some embodiments, sufficient material could be provided to allow the learner to know how to perform technical procedures. When the learner finishes the management of the patient, for example, a block could be provided by the author that gives a congratulations message that allows the learner to know what they have accomplished in this branch. There is another block that lists the key learning points of the branch, so that the learner can reflect on these specific points, and see if they now can reiterate in their own mind what they learned in these key learning points. Following that, the learner could be given a score. Typically, the system is designed so that the learner must get every critical answer shown (or green dot) in order to proceed. However, the learner can get as many yellow (relevant, but not correct response) or red dots (irrelevant or incorrect response) as they choose to investigate for additional learning. At the end, the learner could get a score, showing how many yellow and red dots they have accumulated while going through the branch. As a learning tool, the system suggests that the learner look at all of the yellow and red dots at some point in reviewing the branch so that they understand the thinking behind the answer being either wrong or possibly right. This again is a very useful process for the learner.

Once the storyboard is complete, it goes to the programmer to develop the software version. When the software version is completed, it could be reviewed for content, which could result in changes, modifications, additions, or deletions that are submitted to the programmer. Once that is complete, the branch could be reviewed again to be sure that it is accurate, that there are no inadvertent changes. Content could be validated by data or expert consensus. If the branch appears to be complete and accurate, it may be placed on-line for the learner(s) to use.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A computerized educational method comprising the steps of:
    presenting one or more medical conditions of a hypothetical patient on a video display system;
    presenting a question concerning the hypothetical patient on the video display system;
    presenting a plurality of potential responses to the question on the video display system, wherein the plurality of potential responses are categorized into a correct category indicative of a response that is critical to care with regard to the medical conditions presented about the hypothetical patient, a reasonable category indicative of a response that is not critical to care of the hypothetical patient, but potentially helpful with regard to the medical conditions presented about the hypothetical patient, and an unreasonable category indicative of a response that is not critical to care and not potentially helpful with regard to the medical conditions presented about the hypothetical patient;
    receiving a selection from the plurality of potential responses through user interaction of a user interface displayed on the video display system; and
    indicating in a visual manner which category corresponds with the selection by displaying an indicator corresponding to the selection that distinguishes between the correct category, the reasonable category, and the unreasonable category.

2. The method of claim 1, further comprising the step of presenting an additional medical condition of the hypothetical patient responsive to a selection in the correct category.

3. The method of claim 2, further comprising the step of presenting a rationale explaining why the selection: (1) is reasonable; and (2) not the best choice in response to a selection in the reasonable category.

4. The method of claim 3, further comprising the step of presenting a rationale why the selection is incorrect in response to a selection in the reasonable category.

5. The method of claim 1, wherein the indicating step provides at least one of a color, text, and symbol to distinguish between the correct category, reasonable category, and unreasonable category.

6. The method of claim 5, wherein the correct category corresponds with a green indicator.

7. The method of claim 5, wherein the reasonable category corresponds with a yellow indicator.

8. The method of claim 5, wherein the unreasonable category corresponds with a red indicator.

9. The method claim 1, wherein a plurality of responses in the correct category are presented with the question.

10. The method of claim 1, wherein a plurality of responses in the reasonable category are presented with the question.

11. The method of claim 1, wherein a plurality of responses in the unreasonable category are presented with the question.

12. The method of claim 1, further comprising the step of requiring a plurality of selections of responses in the correct category to complete the question.

13. The method of claim 12, further comprising the step of presenting a status indicator that changes responsive to a selection in the correct category to show a progress of the question concerning whether additional selections of responses in the correct category are necessary to complete the question.

14. The method of claim 1, wherein a response in the correct category is a critical question to ask the hypothetical patient based on the medical conditions.

15. The method of claim 1, wherein a response in the correct category is a critical test to order for the hypothetical patient based on the medical conditions.

16. The method of claim 1, wherein a response in the correct category is a critical examination of the hypothetical patient based on the medical conditions.

17. A system for providing an educational system with an interactive patient scenario, the system comprising:
- a storage device configured to store a computer program and a data source, wherein the data source includes a plurality of questions and possible responses that are associated with the questions, and wherein possible responses are categorized into a correct category indicative of a response that is critical to care with regard to the medical conditions presented about the hypothetical patient, a reasonable category indicative of a response that is not critical to care of the hypothetical patient, but potentially helpful with regard to the medical conditions presented about the hypothetical patient, and an unreasonable category indicative of a response that is not critical to care and not potentially helpful with regard to the medical conditions presented about the hypothetical patient;
- a processor in communication with the storage device, wherein the computer program is operable, when executed by the processor, to cause the processor to perform steps comprising:
- presenting one or more medical conditions of a hypothetical patient on a video display system;
- presenting a question from the plurality of questions concerning a hypothetical patient on the video display system;
- presenting at least a portion of the plurality of the potential responses to the question on the video display system;
- receiving a selection from the plurality of potential responses through user interaction of a user interface displayed on the video display system;
- indicating in a visual manner which category corresponds with the selection by displaying an indicator corresponding to the selection that distinguishes between the correct category, the reasonable category, and the unreasonable category;
- wherein an additional medical condition of the hypothetical patient is presented responsive to a selection in the correct category;
- wherein a rationale explaining why the selection: (1) is reasonable; and (2) not the best choice is presented responsive to a selection in the reasonable category; and
- wherein a rationale why the selection is incorrect is presented responsive to a selection in the reasonable category.

18. A computer-readable medium having computer-executable instructions for performing a method comprising:
- presenting one or more medical conditions of a hypothetical patient on a video display system;
- presenting a question concerning the hypothetical patient;
- presenting a plurality of potential responses to the question, wherein the plurality of potential responses are categorized into a correct category indicative of a response that is critical to care with regard to the medical conditions presented about the hypothetical patient, a reasonable category indicative of a response that is not critical to care of the hypothetical patient, but potentially helpful with regard to the medical conditions presented about the hypothetical patient, and an unreasonable category indicative of a response that is not critical to care and not potentially helpful with regard to the medical conditions presented about the hypothetical patient;
- receiving a selection from the plurality of potential responses;
- indicating in a visual manner which category corresponds with the selection;
- wherein a plurality of responses in the correct category are presented with the question;
- wherein a plurality of responses in the reasonable category are presented with the question; and
- wherein a plurality of responses in the unreasonable category are presented with the question.

* * * * *